United States Patent
O'Neal et al.

(10) Patent No.: US 9,580,631 B2
(45) Date of Patent: Feb. 28, 2017

(54) METHOD OF MAKING PACKAGE VISCOELASTIC COMPOSITIONS BY POLYMERIZING ETHYLENICALLY-UNSATURATED MATERIALS USING IONIZING RADIATION

(71) Applicant: 3M INNOVATIVE PROPERTIES COMPANY, St. Paul, MN (US)

(72) Inventors: Daniel J. O'Neal, St. Paul, MN (US); Sasha B. Myers, Arden Hills, MN (US); Karl Richter, St. Paul, MN (US); Thu-Van T. Tran, Maplewood, MN (US); Craig E. Hamer, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 14/648,003

(22) PCT Filed: Dec. 6, 2013

(86) PCT No.: PCT/US2013/073455
§ 371 (c)(1),
(2) Date: May 28, 2015

(87) PCT Pub. No.: WO2014/093141
PCT Pub. Date: Jun. 19, 2014

(65) Prior Publication Data
US 2015/0322304 A1 Nov. 12, 2015

Related U.S. Application Data

(60) Provisional application No. 61/737,221, filed on Dec. 14, 2012.

(51) Int. Cl.
| | | |
|---|---|---|
| *C08F 2/46* | (2006.01) | |
| *C08G 61/04* | (2006.01) | |
| *C09J 133/08* | (2006.01) | |
| *C08K 3/00* | (2006.01) | |
| *C08K 5/00* | (2006.01) | |
| *C09J 7/02* | (2006.01) | |
| *C09J 133/02* | (2006.01) | |

(52) U.S. Cl.
CPC .......... *C09J 133/08* (2013.01); *C08K 3/0008* (2013.01); *C08K 5/0008* (2013.01); *C09J 7/0217* (2013.01); *C09J 133/02* (2013.01)

(58) Field of Classification Search
CPC ..... C09J 133/08; C09J 7/0217; C08K 5/0008; C08K 3/0008

USPC .......... 522/180, 178, 1, 182; 520/1
See application file for complete search history.

(56) References Cited

U.S. PATENT DOCUMENTS

| | | |
|---|---|---|
| 3,786,116 A | 1/1974 | Milkovich |
| 3,842,059 A | 10/1974 | Milkovich |
| 3,897,295 A | 7/1975 | Dowbenko |
| 4,022,855 A | 5/1977 | Hamblen |
| 4,181,752 A | 1/1980 | Martens |
| 4,732,808 A | 3/1988 | Krampe |
| 4,737,559 A | 4/1988 | Kellen |
| 4,810,523 A | 3/1989 | Williams |
| 5,015,280 A | 5/1991 | Kimoto |
| 5,257,491 A | 11/1993 | Rouyer |
| 5,329,406 A | 7/1994 | Nakanishi |
| 5,407,971 A | 4/1995 | Everaerts |
| 5,599,863 A | 2/1997 | Zimmerman |
| 5,804,610 A | 9/1998 | Hamer et al. |
| 5,986,011 A | 11/1999 | Ellis |
| 6,461,728 B2 | 10/2002 | Weiss |
| 7,385,020 B2 | 6/2008 | Anderson |

(Continued)

FOREIGN PATENT DOCUMENTS

| | | |
|---|---|---|
| CN | 1222179 | 7/1999 |
| DE | 3625358 | 2/1988 |

(Continued)

OTHER PUBLICATIONS

Schulz; "Functionally Terminal Polymers via Anionic Methods"; Anionic Polymerization; American Chemical Society; vol. 27, 1981, pp. 427-440.

(Continued)

*Primary Examiner* — Ling Choi
*Assistant Examiner* — Jessica E Whiteley
(74) *Attorney, Agent, or Firm* — James A. Baker

(57) ABSTRACT

Methods of forming an adhesive composition including the steps of (a) combining a non-deaerated mixture comprising at least one free radically (co)polymerizable ethylenically-unsaturated material with a sealable packaging, wherein the packaging contains the non-deaerated mixture; (b) sealing the non-deaerated mixture in the packaging to form a sealed packaging; and (c) exposing the non-deaerated mixture in the sealed packaging to a source of ionizing radiation for a time sufficient to initiate (co)polymerization of at least a portion of the at least one free radically (co)polymerizable ethylenically-unsaturated material to form an adhesive composition in the sealed packaging. The (co)polymerization takes place essentially non-adiabatically. At least a portion of the packaging is meltable and mixable with the adhesive composition so as to provide a flowable coatable adhesive composition when the sealed packaging containing the adhesive composition is heated to a temperature sufficient to melt at least a portion of the packaging.

19 Claims, No Drawings

(56) References Cited

U.S. PATENT DOCUMENTS

| | | |
|---|---|---|
| 2001/0031798 A1 | 10/2001 | Wright |
| 2003/0051807 A1 | 3/2003 | Yamaguchi |
| 2003/0092791 A1 | 5/2003 | Okamitsu |
| 2005/0032926 A1 | 2/2005 | Okamitsu |
| 2010/0151241 A1 | 6/2010 | Hardy |
| 2010/0151471 A1 | 6/2010 | Faham |

FOREIGN PATENT DOCUMENTS

| | | |
|---|---|---|
| EP | 0886672 | 12/1998 |
| EP | 1 318 181 A1 | 6/2003 |
| WO | WO 93-23224 | 11/1993 |
| WO | 97/33945 * | 9/1997 |
| WO | WO 2010-002102 | 1/2010 |
| WO | WO 2010-005655 | 1/2010 |
| WO | WO 2010-005810 | 1/2010 |
| WO | WO 2014-093139 | 6/2014 |
| WO | WO 2014-093142 | 6/2014 |

OTHER PUBLICATIONS

VDA 278, "Thermal Desorption Analysis of Organic Emissions for the Characterization of Non-Metallic Materials for Automobiles;" Oct. 2011, pp. 1-47.

International Search Report for PCT International Application No. PCT/US2013/073455, mailed on Mar. 26, 2014, 4 pages.

* cited by examiner

METHOD OF MAKING PACKAGE VISCOELASTIC COMPOSITIONS BY POLYMERIZING ETHYLENICALLY-UNSATURATED MATERIALS USING IONIZING RADIATION

CROSS REFERENCE TO RELATED APPLICATIONS

This application is a national stage filing under 35 U.S.C. 371 of PCT/US2013/073455, filed Dec. 6, 2013, which claims priority to U.S. Application No. 61/737,221, filed Dec. 14, 2012, the disclosure of which is incorporated by reference in its/their entirety herein.

FIELD

This disclosure relates to a method of radiation polymerizing ethylenically-unsaturated materials, more particularly, polymerizing vinyl-functional monomers and oligomers using ionizing radiation including gamma rays, x-rays, and/or high energy electron beam radiation.

BACKGROUND (Co)polymers of vinyl-functional monomers that are useful, for example, as adhesives, can be produced by bulk (i.e., solvent-free) free-radical (co)polymerization in a batch reactor under essentially adiabatic reaction conditions (see, for example, U.S. Pat. No. 5,986,011). Methods of producing hot melt adhesives in sealed reaction vessels are also known. U.S. Pat. No. 4,810,523 describes a method for producing hot melt adhesives in which a polymerizable monomer composition is introduced into a sealable reaction vessel and polymerized by ionizing radiation. The adhesive is then removed from the reaction vessel before hot melt application. The reaction vessel may be a lined cylindrical pressure vessel or multilayer bag.

Methods of making packaged (co)polymer compositions such as hot melt adhesives and the resulting packaged compositions are known. German Patent No. 36 25 358 describes a hot melt adhesive block in a thermoplastic film. The film is melted and mixed with the adhesive in an extrusion process. U.S. Pat. No. 5,257,491 describes a method of packaging a thermoplastic or thermosetting hot melt adhesive in which a portion of an adhesive composition is surrounded with a plastic packaging material. The plastic packaging material does not substantially adversely affect the adhesive characteristics of a molten mixture of the adhesive and the plastic packaging material. PCT International Pub. No. WO 93/23224 describes a method for packaging hot melt adhesive compositions in which molten hot melt adhesive is poured into a mold lined with a plastic film. The plastic film is meltable with the adhesive composition and blendable into the molten adhesive composition.

SUMMARY

Although methods of producing viscoelastic adhesive compositions such as hot melt adhesives and methods of packaging such viscoelastic adhesive compositions are known, there is a need for a simplified process for making and packaging such compositions to ease subsequent use as hot melt pressure sensitive adhesive coatings. In view of the foregoing, we recognize that there is a need for methods of making adhesive compositions by forming (co)polymers from a reaction mixture of ethylenically-unsaturated materials contained in a packaging material, without de-aerating the reaction mixture, using a source of ionizing radiation to carry out a (co)polymerization in an essentially non-adiabatic manner. Furthermore, we recognize that it would be advantageous if added non-reactive diluents were able to modify the properties of the (co)polymer to make it more suitable for its intended use.

Thus, in one aspect, the present disclosure provides methods of forming an adhesive composition comprising the steps of (a) combining a non-deaerated mixture comprising at least one free radically (co)polymerizable ethylenically-unsaturated material with a sealable packaging, wherein the packaging contains the non-deaerated mixture; (b) sealing the non-deaerated mixture in the packaging to form a sealed packaging; and (c) exposing the non-deaerated mixture in the sealed packaging to a source of ionizing radiation for a time sufficient to initiate (co)polymerization of at least a portion of the at least one free radically (co)polymerizable ethylenically-unsaturated material to form an adhesive composition in the sealed packaging. The (co)polymerization takes place essentially non-adiabatically. At least a portion of the packaging is meltable and mixable with the adhesive composition so as to provide a coatable adhesive composition when the sealed packaging containing the adhesive composition is heated to a temperature sufficient to melt at least a portion of the packaging.

In another aspect, exemplary embodiments of the present disclosure provide an adhesive composition prepared according to any of the foregoing methods, wherein the adhesive composition exhibits a FOG value, determined according to VDA-278, of no more than 1,000 μg/g, and optionally a VOC value, determined according to VDA-278, of no more than 2,000 μg/g. In some exemplary embodiments, the adhesive composition exhibits an optical activity substantially identical to an optical activity of the mixture comprising the free radically (co)polymerizable ethylenically-unsaturated material.

In some exemplary embodiments, the adhesive composition is a pressure sensitive adhesive composition. In certain such exemplary embodiments, the pressure sensitive adhesive composition is a hot melt pressure sensitive adhesive composition. In certain such exemplary embodiments, a pressure sensitive adhesive article incorporating the pressure sensitive adhesive prepared according to any of the foregoing methods comprises at least one layer of the pressure sensitive adhesive on a major surface of a substrate. Optionally, the pressure sensitive adhesive layer has a thickness of at least 1 mm.

LISTING OF EXEMPLARY EMBODIMENTS

In some exemplary embodiments of any of the foregoing methods, the mixture can be non-heterogeneous. In certain exemplary embodiments of any of the foregoing methods, the mixture is substantially free of thermally-induced or UV-induced free radical (co)polymerization initiators. In additional exemplary embodiments of any of the foregoing methods, the source of ionizing radiation is selected from a gamma ray source, an x-ray source, an electron beam source having an emission energy of greater than 300 keV, and combinations thereof. Preferably, the ethylenically-unsaturated materials are selected from vinyl-functional monomers, vinyl-functional oligomers, vinyl-functional macromers, and combinations thereof.

In some exemplary embodiments of any of the foregoing methods, the mixture is blanketed with an inert gas to reduce oxygen levels in a vapor space of the packaging before the completion of step (b). In further exemplary embodiments of any of the foregoing methods, the mixture is exposed to ionizing radiation for a time sufficient to receive a dose of ionizing radiation up to 100 kiloGray.

In some particular exemplary embodiments of the foregoing methods, the ethylenically-unsaturated materials are comprised of vinyl-functional monomers. In certain such embodiments, the vinyl-functional monomers are comprised of monofunctional unsaturated (meth)acrylate esters of a non-tertiary alkyl alcohol, wherein the non-tertiary alkyl alcohol comprises an alkyl group containing from 1 to about 30 carbon atoms, more preferably 1 to 18 carbon atoms. In certain such embodiments, monofunctional unsaturated (meth)acrylate esters of a non-tertiary alkyl alcohol are selected from the group consisting of isooctyl acrylate, isononyl acrylate, 2-ethylhexyl acrylate, 2-octyl acrylate, 3-octyl acrylate, 4-octyl acrylate, decyl acrylate, dodecyl acrylate, n-butyl acrylate, hexyl acrylate, octadecyl acrylate, methyl acrylate, ethyl acrylate, butyl acrylate, methyl methacrylate, N-butyl methacrylate, 2-methyl butyl acrylate, and mixtures thereof. In some particular embodiments, the free radically (co)polymerizable ethylenically-unsaturated monomers are comprised of difficult to (co)polymerize monomers selected from N-vinyl pyrrolidone, N,N-dimethyl acrylamide, (meth)acrylic acid, acrylamide, N-octyl acrylamide, styrene, vinyl acetate, and combinations thereof.

In certain embodiments of any of the foregoing methods, the mixture further comprises a chain transfer agent. In some such embodiments, the chain transfer agent is selected from the group consisting of carbon tetrabromide, hexanebromoethane, bromotrichloromethane, ethanethiol, isooctylthioglycoate, 2-mercaptoethanol, 3-mercapto-1,2-propanediol, 2-butyl mercaptan, n-octyl mercaptan, t-dodecylmercaptan, 2-ethylhexyl mercaptopropionate, 2-mercaptoimidazole, 2-mercaptoethyl ether, cumene, ethyl acetate, ethanol, 2-propanol, and combinations thereof. In certain such embodiments, the concentration of the chain transfer agent in the mixture is from 0.01% to 20% by weight, based upon the total weight of the mixture. In some particular such embodiments, the concentration of the chain transfer agent in the mixture is no more than about 0.2% by weight, based upon the total weight of the mixture.

In additional or alternative embodiments of any of the foregoing methods, the mixture further comprises a photoinitiator. In some such embodiments, the photoinitiator is selected from the group consisting of acetophenones, substituted alpha-ketols, benzoin ethers, substituted benzoin ethers, aromatic sulfonyl chlorides, 2,4,6-trimethylbenzoyl-diphenyl-phosphineoxide, 2-hydroxy-2-methyl-1-phenyl-propan-1-one, 1-hydroxy-cyclohexyl-phenyl-ketone, 2,2-dimethoxy-1,2-diphenylethan-1-one, bis(2,4,6-trimethylbenzoyl)-phenylphosphineoxide], benzene, (1-methylethenyl)-, homopolymer, Ar-(2-hydroxy-2-methyl-1-oxopropyl), and combinations thereof.

In further exemplary embodiments of any of the foregoing methods, the mixture further comprises a non-reactive diluent selected from the group consisting of plasticizers, tackifiers, particulate fillers, non-volatile organic solvents, and combinations thereof. In some such embodiments, the non-reactive diluent is added at a level of from about 1% to about 25% by weight, based upon the total weight of the mixture.

In certain exemplary embodiments of the foregoing methods including a non-reactive diluent, the non-reactive diluent is selected to include a plasticizer. In some particular such embodiments, the plasticizer is selected from the group consisting of dioctyl phthalate, phosphate esters, and alkyl or aryl functionalized polyalkylene oxides.

In additional exemplary embodiments of any of the foregoing methods including a non-reactive diluent, the non-reactive diluent is selected to include a tackifier. In some particular such embodiments, the tackifier is selected from the group consisting of esters of hydrogenated rosins and synthetic hydrocarbon resins.

In some exemplary embodiments of any of the foregoing methods including a non-reactive diluent, the non-reactive diluent is selected to include a particulate filler. In some particular such embodiments, the particulate filler is selected from the group consisting of surface treated particulates, electrically conductive particulates, metal oxide particulates, and combinations thereof. In certain such embodiments, the particulate filler comprises a population of nanoparticulates having a median particulate diameter less than one micrometer. In further such embodiments, the particulate filler is added at a level of about 1% to about 50% by weight, based upon the total weight of the mixture.

In certain exemplary embodiments of any of the foregoing methods including a non-reactive diluents, the non-reactive diluent is selected to include a non-volatile organic solvent miscible in the mixture in an amount of less than 20% by weight, based on the total weight of the mixture.

In some exemplary embodiments of any of the foregoing methods, the mixture has a concentration of the free radically (co)polymerizable ethylenically-unsaturated monomers less than 3% by weight of the total weight of the mixture at the completion of step (c). In certain such exemplary embodiments, the mixture has a concentration of the free radically (co)polymerizable ethylenically-unsaturated material less than 1% by weight of the total weight of the mixture at the completion of step (c). In other exemplary embodiments of any of the foregoing methods, the mixture has a gel content less than 10% by weight, based on the total weight of the mixture, at the completion of step (c).

In further exemplary embodiments of any of the foregoing methods, the method includes removing the packaging from the adhesive composition and heating the adhesive composition to a temperature above a glass transition temperature of the adhesive composition. In certain exemplary embodiments, the sealed packaging is formed by disposing the mixture between a pair of sheets, wherein the pair of sheets are sealed to contain the mixture; at least one of the sheets is meltable and mixable with the adhesive when the sealed packaging containing the adhesive composition is heated to a temperature sufficient to melt the at least one sheet. In some such embodiments, the pair of sheets is heat sealed to form the sealed packaging after disposing the mixture between the sheets, thereby containing the mixture. In some particular such embodiments, the method includes removing one of the sheets prior to heating the adhesive composition to a temperature sufficient to melt the other sheet.

In certain exemplary embodiments of any of the foregoing methods, the method further includes contacting the sealed packaging containing the mixture with a heat exchange medium during step (c). In some particular such embodiments, the heat exchange medium is maintained at a temperature less than a temperature of the adhesive composition in the sealed packaging. In additional exemplary embodiments of any of the foregoing methods, the method further includes exposing the adhesive composition in the sealed packaging to ultraviolet radiation after completion of step (c). In additional exemplary embodiments of any of the foregoing methods, the method further includes heating the adhesive composition to a temperature above the glass transition temperature of the adhesive composition, optionally wherein the adhesive composition is contained within the sealed packaging at the onset of heating.

Unexpected Advantages of Some Exemplary Embodiments

The various processes and methods of the present disclosure, in some exemplary embodiments, advantageously provide a continuous or semi-continuous, high-throughput (co)polymerization process useful in making adhesives contained within a packaging material, more preferably packaged pressure sensitive adhesives, even more preferably packaged hot melt pressure sensitive adhesives. Our calculations show that a 1 MCi source of ionizing radiation could result in throughputs as high as 6 million lb/yr of packaged adhesive product in a highly optimized configuration.

Furthermore, use of ionizing radiation to initiate polymerization can yield adhesive compositions (i.e., (co)polymers) which are highly branched and/or cross-linked, and are thus particularly well-suited for adhesive applications. Thus, use of ionizing radiation to initiate (co)polymerization may produce an adhesive composition, more particularly a pressure sensitive adhesive, even more particularly a hot melt pressure sensitive adhesive, containing low or no volatile organic compounds (VOC), low or reduced FOG, decreased odor, and improved stability.

Also, high-energy photons penetrate deeply into the monomer mixture, eliminating undesirable energy gradients and making large-scale bulk polymerization possible, even under substantially non-adiabatic conditions. More particularly, use of ionizing radiation to initiate (co)polymerization facilitates carrying out non-adiabatic bulk polymerization in the absence of added volatile organic solvents (often added to the reaction mixture to prevent the reaction temperature from becoming so high as to create a thermal runaway condition by evaporative heat removal of the volatile organic solvent).

Furthermore, use of ionizing radiation to initiate (co)polymerization of ethylenically-unsaturated materials can be effectively carried out without requiring deaeration or deoxygenation of the reaction mixture (e.g., by sparging the reaction mixture with an inert gas to remove dissolved oxygen which can inhibit initiation of free radical formation), and without added chemical initiators, such as thermal initiators or photoinitiators.

Additionally, thermally- or photo-initiated free radical (co)polymerization generally leaves in the (co)polymerization product a fraction of the residual initiator and initiator fragments which can cause haze, and which may yellow over time. In contrast, the use of ionizing radiation to initiate polymerization generally does not require the addition of a polymerization initiator, as the ionizing radiation itself initiates (co)polymerization. Thus, (co)polymerization using ionizing radiation produces a cleaner reaction product with less haze and yellowing.

Furthermore, the absence of initiators makes the optical activity (absorbance of light) of the final (co)polymer adhesive composition substantially identical to that of the mixture of ethylenically-unsaturated material used as the starting point in the (co)polymerization process, and thus the resulting (co)polymers are generally optically inert and/or optically clear. In some exemplary embodiments, the resulting adhesive may be a liquid optically clear adhesive.

Thus, another advantage associated with use of ionizing radiation to initiate polymerization includes the potential to produce clean and clear (co)polymer adhesives suitable for use in electronic, medical, passenger vehicle interior, and optical applications. Use of ionizing radiation during the (co)polymerization process tends to graft lower molecular weight species to larger polymer networks, reducing residual levels of undesirable extractable materials, such as residual monomers, and other undesirable by-products. (Co)polymers produced with low extractables and no initiators (or their fragments) can be particularly useful in applications where these residuals and by-products are undesirable, such as in skin-contacting medical tapes or low volatile organic compound (VOC) adhesives for use in passenger vehicle (e.g., aircraft, trains, automobiles and boats) interiors.

Various aspects and advantages of exemplary embodiments of the present disclosure have been summarized. The above Summary is not intended to describe each illustrated embodiment or every implementation of the present disclosure. The Detailed Description that follows more particularly exemplifies certain presently preferred embodiments using the principles disclosed herein.

DETAILED DESCRIPTION

Acrylic pressure sensitive adhesives (PSA's) are typically synthesized using a chemical initiator—one that is mixed with a monomer(s) and activated at elevated temperature or by exposure to visible/ultraviolet light. These thermal and photo-initiators can be expensive, and the residual initiator or initiator fragments remaining after polymerization can adversely affect adhesive performance over time. Using gamma radiation as the initiation source can reduce or eliminate the need for chemical initiators.

Initiator-free compositions are especially useful for two broad classes of adhesives: optically clear adhesives (OCAs) and low VOC/FOG adhesives (those with low organic emissions). The absence of initiator in GP adhesive compositions makes them as optically clear (or inert) as their component monomers—generally exhibiting high light transmission, low haze, and low yellowness. The initiator and fragments can also contribute to the adhesive's volatile organic compounds (VOC) or FOG emissions. These components are especially problematic, as they are not easily removed by vacuum during extrusion.

Gamma radiation induces polymerization by directly ionizing the monomer mixture, generating free radicals from which propagation can occur. The depth of penetration and low dose rate of gamma photons are ideal for creating high molecular weight polymers, as initiation occurs throughout the bulk and at a low enough frequency to allow time for long-chain growth. Gamma radiation produces radicals statistically on all species present: difficult-to-polymerize monomers, existing polymer chains, and any other monomers or additives. Thus, incorporation of ethylenically-unsaturated materials with lower reactivity is possible, and short chains can be grafted into a larger polymer network. Ultimately, more highly-branched, multi-functional, lower-residual adhesives can be produced than with chemical initiators.

For ionizing radiation (co)polymerized adhesives, the adhesive properties may be tailored by changing total dose or dose rate (quantity and frequency of free radical generation), rather than relying on compositional changes alone. For example, higher total dose will produce a more cross-linked adhesive, even in the absence of multi-functional monomers. A higher dose rate can generate (co)polymers with higher short-branch content, virtually impossible using standard thermal or photo-initiators.

Although dose can be useful for small adjustments, tailoring (co)polymer properties using dose alone can be a challenge. Target doses must be high enough to ensure nearly complete monomer conversion, but not so high as to cross-link the polymer network—typically ~4 kGy. At low levels of chain transfer agent (CTA), i.e., those typical for traditional UV or thermally-initiated systems, this window is fairly small—1 or 2 kGy. One to two kGy precision is not difficult to attain in an experimental capacity, but would pose a large challenge on a manufacturing scale. By incorporating large quantities of CTA (2-6 times traditional levels), we have greatly expanded the range of acceptable dose, creating a robust operational process window suitable for a continuous manufacturing process. We are able to produce highly converted, low gel adhesives at doses of 4.5 to >45 kGy.

For typical UV- or thermally-initiated polymerizations, formulations containing high quantities of CTA would produce short-chain adhesives with poor performance. Any short chain produced will persist in the final composition, unless, of course, it goes through another transfer event (unlikely). With gamma polymerization, short chains are not "dead". Initiation events occur randomly on the short chains and longer ones, and those free-radicals can combine or provide a site for additional monomer incorporation. Thus, through gamma polymerization, we create high molecular weight, branched polymer structures by combining short chains, longer ones, and monomer. These, and other unexpected results and advantages of various processes of the present disclosure are described in detail below.

Throughout the specification, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

For the following Glossary of defined terms, these definitions shall be applied for the entire application, unless a different definition is provided in the claims or elsewhere in the specification.

GLOSSARY

Certain terms are used throughout the description and the claims that, while for the most part are well known, may require some explanation. It should understood that, as used herein:

The terms "about" or "approximately" with reference to a numerical value or a shape means +/− five percent of the numerical value or property or characteristic, but expressly includes the exact numerical value. For example, a temperature of "about" 100° C. refers to a temperature from 95° C. to 105° C., but also expressly includes a temperature of exactly 100° C.

The term "substantially" with reference to a property or characteristic means that the property or characteristic is exhibited to a greater extent than the opposite of that property or characteristic is exhibited. For example, a process that is "substantially" non-adiabatic refers to a process in which the amount of heat transferred out of a process is the same as the amount of heat transferred into the process, with +/−5%.

The terms "a", "an", and "the" include plural referents unless the content clearly dictates otherwise. Thus, for example, reference to a material containing "a compound" includes a mixture of two or more compounds.

The term "or" is generally employed in its sense including "and/or" unless the content clearly dictates otherwise.

The term "homogeneous" means exhibiting only a single phase of matter when observed at a macroscopic scale.

The term "non-heterogeneous" means "substantially homogeneous"

The terms "(co)polymer" or "(co)polymers" includes homopolymers and (co)polymers, as well as homopolymers or (co)polymers that may be formed in a miscible blend, e.g., by co-extrusion or by reaction, including, e.g., transesterification. The term "(co)polymer" includes random, block and star (e.g. dendritic) (co)polymers.

The term "(meth)acrylate" with respect to a monomer, oligomer or means a vinyl-functional alkyl ester formed as the reaction product of an alcohol with an acrylic or a methacrylic acid.

The term "liquid optically clear adhesive composition" means a liquid optically clear adhesive (LOCA) or a precursor composition which may be cured to form a LOCA.

The term "glass transition temperature" or "$T_g$" refers to the glass transition temperature of a (co)polymer when evaluated in bulk rather than in a thin film form. In instances where a (co)polymer can only be examined in thin film form, the bulk form $T_g$ can usually be estimated with reasonable accuracy. Bulk form $T_g$ values usually are determined by evaluating the rate of heat flow vs. temperature using differential scanning calorimetry (DSC) to determine the onset of segmental mobility for the (co)polymer and the inflection point (usually a second-order transition) at which the (co)polymer can be said to change from a glassy to a rubbery state. Bulk form $T_g$ values can also be estimated using a dynamic mechanical thermal analysis (DMTA) technique, which measures the change in the modulus of the (co)polymer as a function of temperature and frequency of vibration.

The term "molecularly same (co)polymer(s)" means (co)polymer(s) that have essentially the same repeating molecular unit, but which may differ in molecular weight, method of manufacture, commercial form, and the like.

The term "cross-linked" (co)polymer refers to a (co)polymer whose molecular chains are joined together by covalent chemical bonds, usually via cross-linking molecules or groups, to form a network (co)polymer. A cross-linked (co)polymer is generally characterized by insolubility, but may be swellable in the presence of an appropriate solvent.

As defined herein, by "essentially non-adiabatic" it is meant essentially not "adiabatic," where "adiabatic" means that the total of the absolute value of any energy exchanged to or from the reaction mixture during the course of reaction equals (within 15%) the total energy liberated due to reaction for the corresponding amount of (co)polymerization that has occurred during the time that (co)polymerization has occurred. Expressed mathematically, the essentially adiabatic criterion (for (co)polymerization of monomers) is:

$$\int_{t_1}^{t_2} \sum_{j=1}^{N} |q_j(t)| dt \le f \cdot \int_{x_1}^{x_2} \Delta H_p(x) dx \qquad (1)$$

where f is about 0.15, $\Delta H_p$ is the heat of (co)polymerization, x=monomer conversion=$(M_O-M)/M_O$ where M is the concentration of the monomer and $M_O$ is the initial monomer concentration, $x_1$ is the (co)polymer fraction at the start of the reaction and $x_2$ is the (co)polymer fraction due to (co)polymerization at the end of the reaction, t is the time. $t_1$ is the time at the start of reaction, $t_2$ is the time at the end of reaction, and $q_j(t)$, wherein j=1 . . . N is the rate of energy transferred to the reacting system from the surroundings from all N sources of energy flow into the system. Examples of energy transfer sources for $q_j(t)$, wherein j=1 . . . N include, but are not limited to, heat energy conducted to or from the reaction mixture from the reactor jacket, energy required to warm internal components in the reaction equipment such as the agitator blades and shaft, and work energy introduced from mixing the reacting mixture. In the practice of the present disclosure, having f as close to zero as possible is preferred to maintain uniform conditions within a reaction mixture during a reaction (that is, maintain homogeneous temperature conditions throughout a reaction mixture) which helps to minimize batch-to-batch variations in a particular piece of equipment as well as minimize batch-to-batch variations when reactions are made in batch reactors of differing sizes (that is, uniform scale up or scale down of reaction).

As used herein, a "reaction cycle" is defined as a processing sequence where initiator(s), monomers (which are not optional in the first reaction cycle, but which may be optional in subsequent reaction cycles), non-reactive diluent/filler (which are not optional in the first reaction cycle, but which may be optional in subsequent reaction cycles), and optional component(s) are added to the reaction mixture followed by one or more essentially non-adiabatic reactions with optional heating between the essentially non-adiabatic reactions.

As used herein, the term "diluent" specifically excludes volatile solvents, for example, volatile solvents such as toluene, ethyl acetate, and acetone, which are typically removed from the (co)polymer product.

The term "non-reactive" refers to diluents (including fillers) that do not contain free radically reactive ethylenically-unsaturated groups that can co-react with the comonomers of the base (co)polymer, or functionalities that significantly inhibit monomer (co)polymerization or significantly chain transfer during the (co)polymerization of monomers.

The term "layer" means a single stratum formed between two major surfaces. A layer may exist internally within a single web, e.g., a single stratum formed with multiple strata in a single web having first and second major surfaces defining the thickness of the web. A layer may also exist in a composite article comprising multiple webs, e.g., a single stratum in a first web having first and second major surfaces defining the thickness of the web, when that web is overlaid or underlaid by a second web having first and second major surfaces defining the thickness of the second web, in which case each of the first and second webs forms at least one layer. In addition, layers may simultaneously exist within a single web and between that web and one or more other webs, each web forming a layer.

The term "adjoining" with reference to a particular first layer means joined with or attached to another, second layer, in a position wherein the first and second layers are either next to (i.e., adjacent to) and directly contacting each other, or contiguous with each other but not in direct contact (i.e., there are one or more additional layers intervening between the first and second layers).

By using terms of orientation such as "atop", "on", "covering", "uppermost", "underlying" and the like for the location of various elements in the disclosed coated articles, we refer to the relative position of an element with respect to a horizontally-disposed, upwardly-facing substrate. It is not intended that the substrate or articles should have any particular orientation in space during or after manufacture.

By using the term "overcoated" to describe the position of a layer with respect to a substrate or other element of a film of this present disclosure, we refer to the layer as being atop the substrate or other element, but not necessarily contiguous to either the substrate or the other element.

By using the term "separated by" to describe the position of a (co)polymer layer with respect to two inorganic barrier layers, we refer to the (co)polymer layer as being between the inorganic barrier layers but not necessarily contiguous to either inorganic barrier layer.

Exemplary Process Embodiments

Various exemplary embodiments of the present disclosure will now be described. Exemplary embodiments of the present disclosure may take on various modifications and alterations without departing from the spirit and scope of the present disclosure. Accordingly, it is to be understood that the embodiments of the present disclosure are not to be limited to the following described exemplary embodiments, but is to be controlled by the limitations set forth in the claims and any equivalents thereof.

In exemplary embodiments, the present disclosure provides processes for forming an adhesive composition comprising the steps of (a) combining a non-deaerated mixture comprising at least one free radically (co)polymerizable ethylenically-unsaturated material with a sealable packaging, wherein the packaging contains the non-deaerated mixture; (b) sealing the non-deaerated mixture in the packaging to form a sealed packaging; and (c) exposing the non-deaerated mixture in the sealed packaging to a source of ionizing radiation for a time sufficient to initiate (co)polymerization of at least a portion of the at least one free radically (co)polymerizable ethylenically-unsaturated material to form an adhesive composition in the sealed packaging. The (co) polymerization takes place essentially non-adiabatically. At least a portion of the packaging is meltable and mixable with the adhesive composition so as to provide a coatable adhesive composition when the sealed packaging containing the adhesive composition is heated to a temperature sufficient to melt at least a portion of the packaging.

In other exemplary embodiments, the present disclosure provides processes for free radically (co)polymerizing vinyl-functional monomers, vinyl-functional oligomers, or a combination thereof, contained in a packaging material, using a source of ionizing radiation, substantially in the absence of thermal initiators, optionally in the presence of a nanoparticulate filler that can remain in the (co)polymer product.

In certain exemplary embodiments of any of the foregoing processes, the mixture can be non-heterogeneous or homogeneous. In certain exemplary embodiments of any of the foregoing processes, the mixture is substantially free of thermally-induced or UV-induced free radical (co)polymerization initiators. In additional exemplary embodiments of any of the foregoing processes, the source of ionizing radiation is selected from a gamma ray source, an x-ray source, an electron beam source having an emission energy of greater than 300 keV, and combinations thereof.

In certain presently preferred embodiments, the (co)polymer formed at the completion of the polymerization step (c) is a pressure-sensitive adhesive that exhibits a FOG value, determined according to VDA-278 (by heating the adhesive sample to a temperature of 90° C. for 30 minutes and measuring the amount of volatile organic compounds released using gas chromatography/mass spectroscopy), of no more than 1,000 µg/g, and optionally a VOC value, determined according to VDA-278, of no more than 2,000 µg/g.

In some exemplary embodiments of a pressure sensitive adhesive, the optical activity of the at least partially (co)polymerized (co)polymer is substantially identical to that of the mixture comprising the free radically (co)polymerizable ethylenically-unsaturated material.

Free Radically (Co)Polymerizable Ethylenically-Unsaturated Materials

The ethylenically-unsaturated materials suitable for use in practicing exemplary methods of the present disclosure are generally selected from vinyl-functional monomers, vinyl-functional oligomers, vinyl-functional macromers, and combinations thereof.

Vinyl-Functional Monomers

A variety of free radically (co)polymerizable monomers can be used according to the method of the present disclosure. Thus, in some exemplary embodiments, the free radically (co)polymerizable ethylenically-unsaturated material is comprised of vinyl-functional monomers, more preferably, vinyl-functional (meth)acrylate monomers.

The identity and relative amounts of such components are well known to those skilled in the art. Particularly preferred among (meth)acrylate monomers are alkyl (meth)acrylates, preferably a monofunctional unsaturated acrylate ester of a non-tertiary alkyl alcohol, wherein the alkyl group contains 1 to about 30 carbon atoms, more preferably 1 to 18 carbon atoms. Included within this class of monomers are, for example, isooctyl acrylate, isononyl acrylate, 2-ethylhexyl acrylate, decyl acrylate, dodecyl acrylate, n-butyl acrylate, hexyl acrylate, octadecyl acrylate, 2-methyl butyl acrylate, and mixtures thereof.

In some presently preferred embodiments, the monofunctional unsaturated (meth)acrylate esters of a non-tertiary alkyl alcohol are selected from the group consisting of isooctyl acrylate, isononyl acrylate, 2-ethylhexyl acrylate, 2-octyl acrylate, 3-octyl acrylate, 4-octyl acrylate, decyl acrylate, dodecyl acrylate, n-butyl acrylate, hexyl acrylate, octadecyl acrylate, methyl acrylate, ethyl acrylate, butyl acrylate, methyl methacrylate, N-butyl methacrylate, 2-methyl butyl acrylate, and mixtures thereof.

In certain exemplary embodiments, the free radically (co)polymerizable ethylenically-unsaturated monomers are comprised of difficult to (co)polymerize monomers selected from N-vinyl pyrrolidone, N,N-dimethyl acrylamide, (meth)acrylic acid, acrylamide, N-octyl acrylamide, styrene, vinyl acetate, and combinations thereof.

Optionally and preferably in preparing a PSA, polar (co)polymerizable monomers can be (co)polymerized with the (meth)acrylate monomers to improve adhesion of the final adhesive composition to metals and also improve cohesion in the final adhesive composition. Strongly polar and moderately polar (co)polymerizable monomers can be used.

Strongly polar (co)polymerizable monomers include but are not limited to these selected from the group consisting of (meth)acrylic acid, itaconic acid, hydroxyalkyl acrylates, cyanoalkyl acrylates, acrylamides, substituted acrylamides, and mixtures thereof. A strongly polar (co)polymerizable monomer preferably constitutes a minor amount, for example, up to about 25 weight % of the monomer, more preferably up to about 15 weight %, of the monomer mixture. When strongly polar (co)polymerizable monomers are present, the alkyl acrylate monomer generally constitutes a major amount of the monomers in the acrylate-containing mixture, for example, at least about 75% by weight of the monomers.

Moderately polar (co)polymerizable monomers include, but are not limited to, those selected from the group consisting of N-vinyl pyrrolidone, N,N-dimethyl acrylamide, acrylonitrile, vinyl chloride, diallyl phthalate, and mixtures thereof. A moderately polar (co)polymerizable monomer preferably constitutes a minor amount, for example, up to about 40 weight %, more preferably from about 5 weight % to about 40 weight %, of the monomer mixture. When moderately polar (co)polymerizable monomers are present, the alkyl acrylate monomer generally constitutes at least about 60 weight % of the monomer mixture.

Vinyl-Functional Oligomers and Macromers

Macromonomers (macromers) are another ethylenically-unsaturated material useful in certain embodiments of the present disclosure. Described in U.S. Pat. No. 4,732,808 is the use of free-radically (co)polymerizable macromonomers having the general formula X—(Y)$_n$—Z wherein:

X is a vinyl group (co)polymerizable with other monomer(s) in the reaction mixture;

Y is a divalent linking group; where n can be zero or one; and

Z is a monovalent (co)polymeric moiety having a glass transition temperature, T$_g$, greater than about 20° C., and a weight average molecular weight in the range of about 2,000 to about 30,000 and being essentially unreactive under thermally initiated (co)polymerization conditions.

These macromonomers are generally used in mixtures with other (co)polymerizable monomer(s). A preferred macromonomer described in U.S. Pat. No. 4,732,808 can be further defined as having an X group which has the general formula:

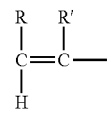

wherein R is a hydrogen atom or a —COOH group and R' is a hydrogen atom or methyl group. The double bond between the carbon atoms provides a (co)polymerizable moiety capable of (co)polymerizing with the other monomer(s) in the reaction mixture.

A preferred macromonomer includes a Z group which has the general formula:

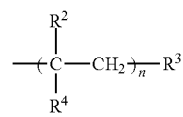

wherein $R^2$ is a hydrogen atom or a lower alkyl group (typically $C_1$ to $C_4$), $R^3$ is a lower alkyl group (typically $C_1$ to $C_4$), n is an integer from 20 to 500 and $R^4$ is a monovalent radical selected from the group consisting of:

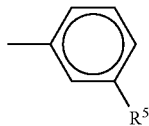

and —$CO_2R^6$ wherein $R^5$ is a hydrogen atom or a lower alkyl group (typically $C_1$ to $C_4$) and $R^6$ is a lower alkyl group (typically $C_1$ to $C_4$).

Preferably, the macromonomer has a general formula selected from the group consisting of:

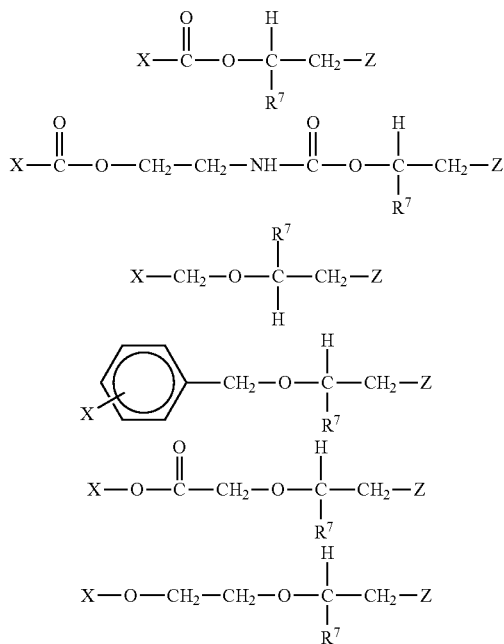

wherein $R^7$ is a hydrogen atom or lower alkyl group (typically $C_1$ to $C_4$).

Preferred macromonomers are functionally terminated (co)polymers having a single functional group (the vinyl group) and are sometimes identified as "semitelechelic" (co)polymers. (Vol. 27 "Functionally Terminal Polymers via Anionic Methods" D. N. Schultz et al., pages 427-440, *Anionic Polymerization*, American Chemical Society [1981]). Such macromonomers are known and may be prepared by the methods disclosed by Milkovich et al. in U.S. Pat. Nos. 3,786,116 and 3,842,059. As disclosed therein, vinyl terminated macromonomer is prepared by anionic (co)polymerization of (co)polymerizable monomer to form a living (co)polymer. Such monomers include those having an olefinic group, such as the vinyl-containing compounds. Living (co)polymers are conveniently prepared by contacting the monomer with an alkali metal hydrocarbon or alkoxide salt in the presence of an inert organic solvent which does not participate in or interfere with the (co) polymerization process. Monomers which are susceptible to anionic (co)polymerization are well known. Illustrative species include vinyl aromatic compounds such as styrene, alpha-methyl styrene, vinyl toluene and its isomers or non-aromatic vinyl compounds such as methyl methacrylate. Other monomers susceptible to anionic (co)polymerization are also useful.

The purpose of using a (co)polymerizable macromonomer includes but is not limited to enabling hot-melt coating of the PSA, for example, by increasing the cohesive strength of the cooled extruded sheet PSA, e.g. by the interaction of the pendant Z moieties on the (co)polymer backbone. The amount of macromonomer used is generally within the range of about 1% to about 30%, preferably about 1% to about 7%, of the total weight of monomers. The optional use of such macromonomers is included within the scope of the present disclosure. A particular advantage of some exemplary embodiments of the present disclosure is the ability to successfully (co)polymerize said macromonomers into the (co)polymer backbone.

Optional Materials

Various optional materials may be added to the reaction mixture used in the processes of the present disclosure before, during, or after any one or more of step (a), (b), and/or (c). Some optional materials, such as chain transfer agents, cross-linkers, photoinitiators, and the like, may react with one or more of the ethylenically-unsaturated material in the reaction mixture, and are preferably added to the reaction mixture before step (a), during step (a), during step (b), during step (c), or a combination thereof.

Optional Chain Transfer Agent(s)

Chain transfer agents, which are well known in the (co)polymerization art, may also be included in any of the processes of the present disclosure, for example, to control the molecular weight or other (co)polymer properties. The term "chain transfer agent" as used herein also includes "telogens." Suitable chain transfer agents for use in exemplary methods of the present disclosure include but are not limited to those selected from the group consisting of carbon tetrabromide, hexanebromoethane, bromotrichloro-methane, ethanethiol, isooctylthioglycoate, 2-mercaptoethanol, 3-mercapto-1,2-propanediol, 2-butyl mercaptan, n-octyl mercaptan, t-dodecylmercaptan, 2-ethylhexyl mercaptopropionate, 2-mercaptoimidazole, 2-mercaptoethyl ether, cumene, ethyl acetate, ethanol, 2-propanol, and combinations thereof.

Depending on the reactivity of a particular chain transfer agent and the amount of chain transfer desired, typically from 0.01% to 25% by weight of chain transfer agent is used, based upon the total weight of ethylenically-unsaturated (co)polymerizable material used in the mixture. More preferably, from about 0.025 wt. % to about 20.0 wt. % of chain transfer agent is used, based upon the total weight of ethylenically-unsaturated (co)polymerizable material used in the mixture. Most preferably, from about 0.04 wt. % to about 15 wt. % of chain transfer agent is used, based upon the total weight of ethylenically-unsaturated (co)polymerizable material used in the mixture.

Optional Crosslinker(s)

Cross-linking may also be used in the processes of the present disclosure. For example, in the art of hot-melt PSA manufacture, PSAs often require a curing step after they have been extruded in sheet form in order to give them good bond strength and toughness. This step, known as post curing, usually comprises exposing the extruded sheet to some form of radiant energy, such as electron beam, or ultraviolet light with the use of a chemical cross-linking agent.

Thus, one or more crosslinker(s) may be may be added to the reaction mixture used in the processes of the present disclosure before, during, or after any one or more of step (a), (b), and/or (c). Examples of suitable cross-linking agents or cross-linkers include but are not limited to those selected from the groups consisting of hydrogen abstraction type photo-cross-linkers such as those based on benzophenones, acetophenones, anthraquinones, and the like. These cross-linking agents can be (co)polymerizable or non-(co)polymerizable.

Examples of suitable non-(co)polymerizable hydrogen abstraction cross-linking agents include benzophenone, anthraquinones, and radiation-activatable cross-linking agents such as those described in U.S. Pat. No. 5,407,971. Such agents have the general formula:

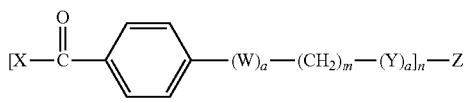

wherein W represents —O—, —N—, or —S—; X represents $CH_3$— or phenyl; Y represents a ketone, ester, or amide functionality; Z represents a polyfunctional organic segment that contains no hydrogen atoms more photo-abstractable than hydrogen atoms of a (co)polymer formed using the cross-linking agent; m represents an integer from 0 to 6; "a" represents 0 or 1; and n represents an integer 2 or greater. Depending on the amount of cross-linking desired and the efficiency of the particular cross-linker used, non-(co)polymerizable cross-linking agents are typically included in the amount of about 0% to about 10%, and preferred in the range of about 0.05% to about 2%, based on the total weight of the ethylenically-unsaturated material (e.g., monomers).

Examples of suitable (co)polymerizable hydrogen abstraction cross-linking compounds include mono-ethylenically-unsaturated aromatic ketone monomers free of orthoaromatic hydroxyl groups.

Examples of suitable free-radically (co)polymerizable cross-linking agents include but are not limited to those selected from the group consisting of 4-acryloxybenzophenone (ABP), para-acryloxyethoxybenzophenone, and para-N-(methacryloxyethyl)-carbamoylethoxy-benzophenone. (Co)polymerizable chemical cross-linking agents are typically included in the amount of about 0% to about 2%, and preferred in the amount of about 0.025% to about 0.5%, based on the total weight of monomer(s). Other useful (co)polymerizable cross-linking agents are described in U.S. Pat. No. 4,737,559.

Optional Photoinitiator(s)

In any of the processes of the present disclosure, the mixture may further comprise a photoinitiator added to the reaction mixture before, during, or after any one or more of step (a), (b), and/or (c). Preferably, the photoinitiator is also an ultraviolet radiation cross-linker. The optional cross-linker may be added to the reaction mixture used in the processes of the present disclosure before, during, or after any one or more of step (a), (b), (c).

Although the optional photoinitiator(s) may be added before or during step (c), the photoinitiators used in the present disclosure are normally not intended to react with the ethylenically-unsaturated material during the (co)polymerization process initiated using a source of ionizing radiation as carried out in steps (a)-(c). In some exemplary processes of the present disclosure, one or more photoinitiators are added to the reaction mixture for use in initiating a subsequent photo-polymerization or photo-curing process, for example, during or after coating of the (co)polymer produced in the ionizing radiation-initiated (co)polymerization processes of the present disclosure onto a substrate. Such subsequent photo-curing processes are particularly well-suited for curing hot melt pressure sensitive adhesive layers. In such embodiments, it is presently-preferred that the optional photoinitiator is added to the (co)polymer after completion of step (c).

Useful classes of photoinitiators include substituted acetophenones such as benzyl dimethyl ketal and 1-hydroxycyclohexyl phenyl ketone, substituted alpha-ketols such as 2-methyl-2-hydroxypropiophenone, benzoin ethers such as benzoin methyl ether, benzoin isopropyl ether, substituted benzoin ethers such as anisoin methyl ether, aromatic sulfonyl chlorides, and possibly photoactive oximes.

Particularly useful photoinitiators are commercially available under the trade designations DAROCURE TPO [CAS Name: 2,4,6-Trimethylbenzoyl-diphenyl-phosphineoxide], DAROCURE 1173 [CAS Name: 2-Hydroxy-2-methyl-1-phenyl-propan-1-one; CAS No.: 7473-98-5], IRGACURE 184 [CAS Name: 1-Hydroxy-cyclohexyl-phenyl-ketone; CAS No.: 947-19-3], IRGACURE 651 [CAS Name: 2,2-Dimethoxy-1,2-diphenylethan-1-one; CAS No. 24650-42-8], and IRGACURE 819 [CAS Name: Bis(2,4,6-trimethylbenzoyl)-phenylphosphineoxide], all manufactured by Ciba Specialty Chemicals, a subsidiary of BASF Corp. (Florham Park, N.J.); and ESACURE KK [CAS Name: benzene, (1-methylethenyl)-, homopolymer, Ar-(2-hydroxy-2-methyl-1-oxopropyl) derivatives; CAS No.: 163702-01-0] manufactured by Lamberti USA, Inc. (Hungerford, Tex.).

The photoinitiator may be used in an amount from about 0.001 to about 5.0 parts by weight per 100 parts of the total ethylenically-unsaturated material in the reaction mixture; preferably from about 0.01 to about 5.0 parts by weight per 100 parts of the total ethylenically-unsaturated material in the reaction mixture; and more preferably in an amount from 0.1 to 0.5 parts by weight per 100 parts of the total ethylenically-unsaturated material in the reaction mixture.

Optional Non-Reactive Diluent and/or Filler

Non-reactive diluents or fillers can be used advantageously in any of the processes of the present disclosure to reduce the adiabatic temperature rise during reaction by absorbing a portion of the heat of reaction. Non-reactive diluents may also reduce the viscosity of the melted (co)polymer product and/or advantageously affect the final properties of the (co)polymer product. Advantageously, the non-reactive diluent or filler can remain in the finished (co)polymer product in its usable form.

Suitable non-reactive diluents are generally non-volatile (that is, they remain present and stable under (co)polymerization and processing conditions) and are compatible (miscible) in the mixture. "Non-volatile" diluents typically generate less than 3% VOC (volatile organic content) during (co)polymerization and processing. The term "compatible" refers to diluents that exhibit no gross phase separation from the base (co)polymer when blended in the prescribed amounts, and that, once mixed with the base (co)polymer, do not significantly phase separate from the base (co)polymer upon aging. Non-reactive diluents include, for example, materials which can raise or lower the glass transition temperature ($T_g$) of the (co)polymer product, including tackifiers such as synthetic hydrocarbon resins and plasticizers such as phthalates.

The non-reactive diluent can also serve as a non-volatile "solvent" for incompatible mixtures of comonomers. Such incompatible comonomer mixtures typically require a volatile reaction medium, such as an organic solvent to promote effective (co)polymerization. Unlike volatile reaction media, the non-reactive diluent does not have to be removed from the (co)polymer product.

Preferred non-reactive diluents include non-volatile organic solvents, plasticizers (flexibilizers) and tackifiers. Appropriate amounts of non-reactive diluent will be familiar to those skilled in the art, and will depend upon numerous factors including, for example, the monomer(s) utilized, the type of non-reactive diluent, and the end use of the (co) polymer product. Typically, however, the amount of non-reactive diluent used is at least about 1 percent by weight, 2 wt. %, 5 wt. %, 7.5 wt. % or even about 10 wt. %; and no more than about 50% by weight, less than 40 wt. %, less than 30 wt. %, less than 20 wt. %, or even less than 10 wt. %, based upon the total weight of the reaction mixture or the finished (co)polymer.

Optional Organic Solvent

In many exemplary processes of the present disclosure, free-radical (co)polymerization can take place without added organic solvents, that is, true bulk (co)polymerization takes place in which the (co)polymer formed as well as the ethylenically-unsaturated starting materials in the reaction mixture are all mutually miscible or even soluble with each other. However, the ethylenically-unsaturated starting materials, particularly polar monomers and/or oligomers and/or macromers, may in some cases require a solvent in order to (co)polymerize. For example, acrylamides are polar monomers which can be advantageously dissolved in a small amount of polar organic solvent in order to make them miscible with isooctyl acrylate. Organic solvents may also be used to reduce the viscosity of the (co)polymer at the end of the (co)polymerization to facilitate draining or subsequent processing.

Therefore, any of the processes of the present disclosure may include the use of organic solvents that are nonreactive with the ethylenically-unsaturated material in the free radical (co)polymerization being carried out. Useful solvents are those that are miscible in the reaction mixture including but not limited to organic solvents such as toluene, hexane, pentane, and ethyl acetate. Presently preferred organic solvents are generally non-volatile, that is, they have normal boiling points above about 100° C., more preferably above about 125° C., 150° C., 175° C., 200° C., or even 225° C.

Presently preferred processes preferably employ no more than about 20 weight percent, 15 wt. %, 10 wt. %, 5 wt. %, 1 wt. %, of organic solvent, which is preferably a non-volatile organic solvent, based on the total weight of the reaction mixture.

Typically, however, any added organic solvent, and more particularly any volatile organic solvent, is preferably substantially removed from the end product, for example, by evaporation, vacuum stripping, and the like. It is presently preferred that organic solvents and more particularly volatile organic solvents comprise no more than about 20 weight percent, 15 wt. %, 10 wt. %, 5 wt. %, 1 wt. %, of the finished (co)polymer material, based on the total weight of the finished (co)polymer material.

Optional Plasticizers

A plasticizer may optionally be used in any of the processes of the present disclosure. Useful plasticizers include, for example, polyalkylene oxides having weight average molecular weights of 150 to about 5,000, or 150 to 1,500, such as polyethylene oxides, polypropylene oxides, polyethylene glycols; alkyl or aryl functionalized polyalkylene oxides, such as that commercially available under the trade designation "PYCAL 94" from CRODA, Inc. (Edison, N.J.); a phenyl ether of polyethylene oxide); monomethyl ethers of polyethylene oxides; monomeric adipates such as dioctyl adipate, dibutyl adipate, dibutoxyethoxyethyl adipate, and dibutoxypropoxypropyl adipate; (co)polymeric adipates such as polyester adipates; citrates such as acetyltri-n-butyl citrate; phthalates such as butyl benzylphthalates, dibutyl phthalate, diisoctyl phthalate; trimellitates; sebacates such as dibutylsebacate; myristates such as isopropyl myristate; polyesters such as those commercially available under the trade designation "PARAPLEX" from C.P. Hall Co. (Chicago, Ill.); phosphate esters such as those commercially available under the trade designation "SANTICIZER" from Ferro Corp. (Mayfield Heights, Ohio), for example, 2-ethylhexyl diphenylphosphate and t-butylphenyl diphenylphosphate); glutarates such as that commercially available from C.P. Hall Co. under the trade designation "PLASTHALL 7050" (a dialkyl diether glutarate); other (co)polymeric plasticizing agents such as polyurethanes, polyureas, polyvinylethers, polyethers, polyacrylates; and mixtures thereof.

Presently preferred plasticizers include, for example, dioctyl phthalate, phosphate esters, and alkyl or aryl functionalized polyalkylene oxides.

Typically, plasticizer will added at a level of about 1% to about 50% by weight (preferably, about 1% to about 25% by weight, more preferably about 1% to about 15% by weight), based upon the total weight of the reaction mixture or finished (co)polymer material.

Optional Tackifiers

A tackifier may optionally be used in any of the processes of the present disclosure. Useful tackifiers include, for example, terpene phenolics, rosins, rosin esters, esters of hydrogenated rosins, synthetic hydrocarbon resins and combinations thereof. Preferred tackifiers include, for example, esters of hydrogenated rosins and synthetic hydrocarbon resins. Typically, tackifier will added at a level of about 1% to about 50% by weight (preferably, about 1% to about 25% by weight, more preferably about 1% to about 15% by weight), based upon the total weight of the reaction mixture or finished (co)polymer material.

Optional Fillers/Nanoparticulates

In any of the processes of the present disclosure, the non-reactive diluent may be comprised of a particulate filler. In certain exemplary embodiments, the particulate filler is selected from the group consisting of surface treated particulates, electrically conductive particulates, metal oxide particulates, and combinations thereof.

Useful fillers are preferably non-reactive such that they do not contain free radically reactive ethylenically-unsaturated groups that can co-react with the ethylenically-unsaturated materials of the reaction mixture, or functionalities that significantly inhibit the (co)polymerization of the reaction mixture, or significantly which affect chain transfer during the (co)polymerization of the reaction mixture. Fillers can, for example, be used to reduce the cost or improve the performance (e.g. the cohesive strength) of the finished (co)polymer material.

Useful fillers include, for example, clay, talc, dye particles and colorants (for example, $TiO_2$ or carbon black), glass beads, metal oxide particles, silica particles, and surface-treated silica particles (such as Aerosil R972 available from Degussa Corporation (Parsippany, N.J.). The filler can also comprise conductive particles (see, for example, U.S. Patent Application Pub. No. 2003/0051807) such as carbon particles or metal particles of silver, copper, nickel, gold, tin, zinc, platinum, palladium, iron, tungsten, molybdenum, solder or the like, or particles prepared by covering the surface of these particles with a conductive coating of a metal or the like.

It is also possible to use non-conductive particles of a (co)polymer such as polyethylene, polystyrene, phenol resin, epoxy resin, (meth)acrylic resin, phenolic resin, benzoguanamine resin, or glass beads, silica, graphite or a ceramic, whose surfaces have been covered with a conductive coating of a metal or the like. Presently preferred fillers include, for example, hydrophobic fumed silica particles, electrically conductive particles, and metal oxide particles.

In additional exemplary embodiments of any of the foregoing processes, the mixture may further include a population of inorganic nanoparticulates having a population median particle diameter of less than one micrometer. In some such exemplary embodiments, the inorganic nanoparticulates are metal oxide particulates selected from titanium dioxide, aluminum oxide, silicon dioxide, indium oxide, tin oxide, zinc oxide, zirconium oxide, and combinations thereof. Nanoparticulate calcium carbonate may also be used. The inorganic nanoparticulates may be distributed, preferably homogeneously distributed, in the mixture before, during, or after completion of the polymerization step, or combinations thereof.

Appropriate amounts of filler will be familiar to those skilled in the art, and will depend upon numerous factors including, for example, the monomer(s) utilized, the type of filler, and the end use of the (co)polymer product. Typically, filler will be added at a level of about 1% to about 50% by weight (preferably, about 2 wt. % to about 30 wt. %; more preferably about 3 wt. % to about 20 wt. %), based upon the total weight of the reaction mixture or finished (co)polymer material.

Optional (Co)Polymer(s)

Optionally, one or more (co)polymer(s) can be dissolved in the reaction mixture prior to the first essentially adiabatic reaction cycle. Alternatively and/or additionally, the optional (co)polymer(s) may be included in subsequent essentially adiabatic reaction cycles. Such (co)polymer(s) may be included to modify the molecular weight distribution, molecular weight, or properties of the final (co)polymer product after reacting is complete and generally will be non-reactive during the (co)polymerization of the inventive process. The use of (co)polymer syrups to make (meth) acrylic (co)polymers is explained, for example, in U.S. Pat. No. 4,181,752.

Although it is not required, the (co)polymer generally will be comprised of, or otherwise compatible with, the same ethylenically unsaturated materials as those used in the reaction mixture. Preferably, the (co)polymer(s) are compatible with the monomer(s), oligomer(s), macromer(s), optional chain transfer agent(s), optional cross-linker(s), optional photoinitiator(s), and the like, added to the reaction mixture.

The optional (co)polymer(s) added to the reaction mixture is typically added in an amount from at least about 1% to at most about 50% by weight; at least about 3 wt. % to at most about 30 wt. %; or at least about 5 wt. % to at most about 20 wt. %, based on the total weight of the reaction mixture or finished (co)polymer material.

Ionizing Radiation Sources

In exemplary embodiments of the present disclosure, a source of ionizing radiation is used to initiate polymerization of the mixture of ethylenically-unsaturated material. Any conventional source of penetrating ionizing radiation may be employed, i.e., any source of low LET (linear energy transfer) radiation which is capable of extracting protons from the monomers to create free radicals which propagate to form (co)polymer chains. The known types of ionizing radiation include, for example, gamma rays and X-rays. Thus, the source of ionizing radiation may be a gamma ray source, an x-ray source, an electron beam source with an emission energy greater than 300 keV, and combinations thereof.

It is presently preferred to employ gamma radiation as the ionizing radiation. Suitable sources of gamma radiation are well known and include, for example, radioisotopes such as cobalt-60 and cesium-137. Generally, suitable gamma ray sources emit gamma rays having energies of 400 keV or greater. Typically, suitable gamma ray sources emit gamma rays having energies in the range of 500 keV to 5 MeV. Examples of suitable gamma ray sources include cobalt-60 isotope (which emits photons with energies of approximately 1.17 and 1.33 MeV in nearly equal proportions) and cesium-137 isotope (which emits photons with energies of approximately 0.662 MeV). The distance from the source can be fixed or made variable by changing the position of the target or the source. The flux of gamma rays emitted from the source generally decays with the square of the distance from the source and duration of time as governed by the half-life of the isotope.

Once a dose rate has been established, the absorbed dose is accumulated over a period of time. During this period of time, the dose rate may vary if the saturated substrate is in motion or other absorbing objects pass between the source and sample. For any given piece of equipment and irradiation sample location, the dose delivered can be measured in accordance with ASTM E-1702 entitled "Practice for Dosimetry in a Gamma Irradiation Facility for Radiation Processing". Dosimetry may be determined per ASTM E-1275 entitled "Practice for Use of a Radiochromic Film Dosimetry System" using GEX B3 thin film dosimeters.

Thus, in certain exemplary embodiments, the reaction mixture is exposed to ionizing radiation for a time sufficient to receive a dose of ionizing radiation up to 100 kiloGray, up to 90 kiloGray, up to 80 kiloGray, up to 70 kiloGray, up to 60 kiloGray, or up to 50 kiloGray. In further exemplary embodiments, the mixture is exposed to ionizing radiation for a time sufficient to receive a dose of ionizing radiation of at least 5 kiloGray, at least 10 kiloGray, at least 20 kiloGray, at least 30 kiloGray, at least 40 kiloGray, or even at least 50 kiloGray.

Reaction Container(s)/Packaging Material(s)

The packaging material used to form the reaction vessel or container is preferably made of a material that when combined with the adhesive composition does not substantially adversely affect the desired adhesive characteristics. A hot melt coated adhesive produced from a mixture of the adhesive composition and the packaging material may have improved adhesive properties compared to a hot melt coated adhesive produced from the adhesive composition alone.

In one embodiment of the disclosure, the reaction mixture is substantially surrounded with the packaging material; in another embodiment of the disclosure, the reaction mixture is completely surrounded with the packaging material. In this embodiment, it is intended that the reaction mixture be completely surrounded by the packaging material, but random variations in production may produce occasional packaged pre-adhesives in which the reaction mixture is not completely surrounded with the packaging material. In yet other embodiments, the reaction mixture is disposed between a pair of sheets.

At least one component of the packaging material (more preferably the entirety of the packaging material) preferably melts at or below the processing temperature of the adhesive (i.e., the glass transition temperature $T_g$, at which the adhesive composition begins to flow). The packaging material preferably has a melting point of 200° C. or less, preferably 170° C. or less. In a preferred embodiment the melting point ranges from 90° C. to 150° C.

The packaging material may be a flexible thermoplastic polymeric film, more preferably an unsupported, non-laminate thermoplastic polymer film. The packaging material is preferably selected from ethylene-vinyl acetate, ethylene-acrylic acid, polypropylene, polyethylene, polybutadiene, or ionomeric films. In a presently preferred embodiment, the packaging material is an ethylene-acrylic acid or ethylene-vinyl acetate film.

A currently preferred packaging material for a type I adhesive composition (as described further below) in which the packaging is not removed from the adhesive composition before further processing, is VA24, an ethylene-vinyl acetate film available from Berry Plastics (Evansville, Ind.). Other suitable polymeric films include heat sealable linear low density polyethylene (LLDPE) films produced by 3M Company (St. Paul, Minn.).

In practicing some embodiments of the present disclosure, films ranging in thickness from about 0.01 mm to about 0.25 mm may be used. The thicknesses preferably range from about 0.025 mm to about 0.127 mm to obtain films that have good strength during processing while being thin enough to heat seal quickly and minimize the amount of film material used.

The amount of packaging material depends upon the type of material and the desired end properties. The amount of packaging material typically ranges from about 0.5 percent to about 20 percent of the total weight of the reaction mixture and the packaging material. Preferably, the packaging material is between 2 percent and 15 percent by weight, and more preferably between 3 percent and 5 percent.

Suitable packaging materials may contain plasticizers, stabilizers, dyes, perfumes, fillers, slip agents, antiblock agents, flame retardants, anti-static agents, microwave susceptors, thermally conductive particles, electrically conductive particles, and/or other materials to increase the flexibility, handleability, visibility, or other useful property of the film, as long as they do not adversely affect the desired properties of the adhesive.

The packaging material should be appropriate for the polymerization method used. For example, with photopolymerization, it is necessary to use a film material that is sufficiently transparent to ultraviolet radiation at the wavelengths necessary to effect polymerization.

Polymerization Methods

Typical reaction(s) with the inventive process proceed as follows. The monomer(s) are charged to the reaction vessel (i.e. the container for the reaction mixture formed using the packaging material), in the desired amount(s). The temperature of the reaction vessel must be cool enough so that virtually no thermal (co)polymerization of the monomer(s) will occur and also cool enough so that virtually no (co)polymerization will occur when the initiator(s) are added to the reaction mixture. Also, care should be taken to ensure the reaction vessel interior is dry, in particular, free of any undesired volatile organic solvent, which potentially could dangerously elevate the pressure within the reaction vessel as the temperature increases due to the heat released during the (co)polymerization.

The optional photoinitiator(s), optional non-reactive diluents(s), optional nanoparticle filler(s), optional chain transfer agent(s), optional cross-linking agent(s), optional (co)polymer(s), optional non-volatile organic solvent(s), etc., may also be charged to the reaction vessel.

In the methods of the present disclosure, it is presently preferred that the reaction mixture not be de-aerated before or during steps (a)-(c) of the process. Deaeration (i.e., de-oxygenation) procedures are well known to those skilled in the art of free-radical (co)polymerization. For example, deaeration is typically accomplished by bubbling (i.e., sparging) an inert gas such as nitrogen through the reaction mixture to displace dissolved oxygen.

However, in some exemplary embodiments, it may be advantageous to blanket (i.e., cover) the reaction mixture with an inert gas to reduce oxygen levels in the vapor space of the reaction vessel above the reaction mixture liquid interface, before completion of step (b). Thus, in some exemplary embodiments, the head space in the reaction vessel may be purged with an inert gas such as nitrogen, helium, argon, and the like, to a level necessary to suppress boiling of the reaction mixture as the temperature rises during reaction. The inert gas pressure also prevents oxygen from entering the (co)polymerization mixture through possible small leaks in the reaction vessel while (co)polymerization is in progress.

Prior to or during exposure of the reaction mixture to a source of ionizing radiation, it may be desirable to pre-cool or cool the reaction mixture as described above, so that the (co)polymerization process may be carried out under essentially non-adiabatic conditions, more preferably non-adiabatic conditions.

In certain embodiments of the processes of the present disclosure, the reaction mixture is exposed to the source of ionizing radiation for only a short period of time at the beginning of step (c) sufficient to initiate the (co)polymerization reaction. In such embodiments, the exposure time to the source of ionizing radiation in step (c) may be advantageously varied from about 1 minute to about 120 minutes, from about 5 min. to about 60 min., from about 10 min. to about 30 min., or even from about 15-20 min.

In other embodiments, it may be desirable to expose the reaction mixture to the source of ionizing radiation for the entirety of step (c). In such embodiments, the exposure time to the source of ionizing radiation in steps (b) and/or (c) may be advantageously varied from about 10 minutes to about 24 hours, from about 20 min. to about 12 hours, from about 30 min. to about 6 hours, or even from about 1 hour to about 3 hours.

(Co)polymerization can be carried out over a wide range of dose rates in the range of a kilorad per second to about a kilorad per hour. It is generally preferred, however, that the dose rate be kept between from 5 to about 500 kilorads per hour, between from about 10 to about 400 kilorads per hour, or even from about 20 to about 250 kilorads per hour. Dose rates below 1 kilorad per hour may result in polymers with molecular weights too high to be useful due to low tack and adhesive failure. Dose rates exceeding a few tenths of a kilorad per second may result in (co)polymers of too low molecular weight to be useful as adhesives due to cohesive failure or low creep resistance. However, some (co)polymer formulations produced above this range may find application in specialty products. In other cases, these low molecular weight (co)polymers may subsequently be cross-linked to provide sufficient cohesion.

Some exemplary processes of the present disclosure allow for careful control of both molecular weight and molecular weight distribution in the final (co)polymer, thereby allowing the practitioner to "tailor" the properties of the resulting (co)polymer, adhesive, pressure-sensitive adhesive, or hot melt pressure sensitive adhesive. Several variables can be manipulated to control the molecular weight of the final product, the most important being radiation dose rate and concentration of chain transfer agent.

Unlike the chemically initiated polymerization procedures of the prior art, in which the rate of chain initiation (and consequently molecular weight) is highly temperature dependent, the polymerization procedure of the present disclosure is relatively unaffected by temperature, except in reaction mixtures where chain transfer is an important factor. Consequently, limitations on the ability to remove all of the heat of reaction from the reactants does not interfere substantially with the ability to control molecular weight in the processes of the present disclosure.

Although temperature is relatively less important in controlling molecular weight in the process of the present disclosure than in chemically initiated (co)polymerizations, it may nevertheless be a significant factor in viscous compositions having relatively high chain transfer to monomer coefficients such as 2-ethylhexyl acrylate and N-vinyl pyrrolidone or for compositions having relatively high concentrations of chain transfer agent. For such compositions, temperature, as well as dose rate, can be varied to obtain the desired molecular weight, with increasing temperature resulting in lower molecular weight. Thus, dose rate, chain transfer agent concentration and temperature can all be used, separately or in combination, to control molecular weight.

In low-solvent or solventless bulk (co)polymerizations, such as those used to produce some exemplary hot-melt pressure sensitive adhesives of the present disclosure, molecular weight can be controlled effectively by manipulation of composition, dose rate, and initial temperature since the viscosity buildup in the reaction mixture makes the removal of heat and control of reaction temperature difficult.

The molecular weight distribution can be controlled by varying the dose rate in a continuous or stepwise manner during the (co)polymerization reaction. It is thus possible to produce polydisperse or polymodal molecular weight distributions which make possible the production of a wide range of products having a variety of adhesive and cohesive products. For example, the (co)polymerization reaction may be carried out at a first dose rate for a period of time and then the dose rate changed for the remainder of the (co)polymerization in order to produce an essentially bimodal molecular weight distribution.

The total integrated radiation dose primarily affects the degree of conversion of the ethylenically-unsaturated material to the finished (co)polymer material. In general, it is desirable to irradiate to conversions of 95% or greater and preferably to conversions of 99.5% or higher. However, the reaction rate becomes asymptotic with time as monomer concentration is depleted, and it becomes more difficult to achieve very high conversion. Low solvent or solventless reaction mixtures are not generally preferred, since higher viscosity leads to reduced monomer reaction and lower conversion. However, solventless compositions may be polymerized using the processes of the present disclosure, to achieve very low levels of residual monomer. This is particularly important in pressure-sensitive adhesives used for medical applications, where even small amounts of residual monomer may irritate the skin.

This is particularly important in pressure-sensitive adhesives used for medical applications, where even small amounts of residual monomer may irritate the skin.

During the asymptotic or monomer depletion stage of the reaction, radiation cross-linking will begin to occur. Radiation induced cross-linking will be more significant as solids concentration increases. Cross-linking may be minimized by the inclusion of chain transfer agent but only at the expense of obtaining lower molecular weights for the finished (co) polymer material.

There are cases where over-irradiation to achieve a degree of cross-linking may be permissible, or even desirable. Cross-links may be tolerated or even desired up to a certain density as they give greater cohesion and creep resistance. However, in too great a density, cross-linking will adversely affect product coating and performance; thus, over-irradiation must be limited. Cross-linking relative to monomer consumption near the end of the reaction is greater at higher dose rates. To achieve high degrees of conversion while preventing product deterioration, a finishing step dose rate of less than 200 kilorads per hour is preferred.

The process may be varied to produce a wide variety of (co)polymers exhibiting a broad range of final adhesive properties, among them molecular weight distribution, residual monomer concentration, cross-link density, tack, shear strength, and the like. Post application of ultraviolet or ionizing irradiation may be employed to further alter properties of the (co)polymer, particularly when used as a hot melt adhesive. Final adhesive properties will depend on both polymerization and post-application processing conditions. Products containing some degree of residual monomer may be particularly useful where post application irradiation is employed.

The higher molecular weights obtainable and pre-application cross-linking make possible the production of (meth) acrylic (co)polymer adhesives, either in solution or solventless, which require significantly less post-application curing, by either chemical or radiation processes, than many existing products.

As previously indicated, some exemplary processes of the present disclosure may be carried out in the absence or near absence of solvent to produce (meth)acrylate-based pressure-sensitive adhesives suitable for hot-melt application. As the amount of solvent in the reaction system approaches zero, reaction conditions become essentially adiabatic due to the inability to remove the heat of polymerization from the reaction mixture. Nevertheless, we have discovered that the polymerization processes of the present disclosure can be performed without de-aeration of the reaction mixture under essentially non-adiabatic conditions, without a breakdown in molecular weight or creation of a runaway reaction.

Because the (co)polymerization is carried out substantially non-adiabatically, preferably while cooling the reaction mixture (e.g. in a water bath), the heat of reaction released after initiation of the (co)polymerization process by exposure of the reaction mixture to the source of ionizing radiation is substantially removed from the reaction mixture during (co)polymerization. Nevertheless, the rapid release of the heat of reaction may, in some cases, act to increase the temperature of the reaction mixture. The temperature of the reaction mixture generally rises to a peak temperature, then begins to drop as the supply of ethylenically-unsaturated material in the reaction mixture is converted to (co)polymer, and the (co)polymerization reaction(s) approach completion.

Once the reaction temperature has peaked, the (co)polymer content at this point is typically from about 30-90% by weight based on the total weight of ethylenically-unsaturated material and (co)polymer in the reactor. The (co) polymerization reaction cycle can be stopped at this point. Typically, the reaction mixture temperature is cooled to a temperature of about 20-40° C.

Packaged Adhesive Composition(s)

The present disclosure also provides methods for making packaged viscoelastic adhesive compositions in which the packaging material is either retained following polymerization (and thus becomes part of the final product), i.e., a "Type I Composition", or is removed following polymerization and prior to subsequent processing, i.e. a "Type II Composition". The two types of compositions will be discussed separately further below. The description of the two types of products will be made with particular reference to hot melt adhesive compositions. However, the principles described below are equally applicable to other types of viscoelastic compositions, including pressure sensitive adhesives, adhesives generally, hot melt processable sealants, vibration damping materials, and viscoelastic gels useful for medical applications.

The present disclosure provides a method of making a packaged, thermoplastic or thermosettable, hot melt adhesive composition. For Type I compositions, the packaging material is selected such that it does not substantially adversely affect the desired adhesive properties of the hot melt adhesive composition when the hot melt adhesive composition and the packaging material are heated above the melting temperature of at least one component of the packaging material, and mixed together to form a flowable, coatable melt.

The disclosure also provides a method of making two or more packages of a packaged, thermoplastic or thermosettable hot melt adhesive. In this method, two or more portions of a reaction mixture are provided and each of the portions is completely surrounded with a packaging material. These portions are then (co)polymerized as described above.

In one preferred embodiment, the reaction mixture is completely surrounded by the packaging material. Preferably, from 0.1 to 5,000 g of reaction mixture is completely surrounded by the packaging material. In another preferred embodiment, from 1 to 1,000 g of reaction mixture is completely surrounded by the packaging material.

In yet another embodiment of the disclosure, the reaction mixture is substantially surrounded by the packaging material. In a further embodiment, the reaction mixture is disposed between a pair of two substantially parallel sheets of packaging material.

In the Type II compositions, the packaging material is removed after polymerization so that any further processing, e.g., melting, coating, or simply application of the adhesive, involves only the adhesive. The adhesive and reaction mixtures described above in the case of the Type I compositions are equally suitable for the Type II compositions, as are the polymerization processes and conditions used to prepare the adhesive.

The packaging materials described in connection with the Type I compositions are also suitable. However, because the packaging material is removed before any post-polymerization processing, the choice of packaging material is not limited to materials that will not substantially affect the adhesive properties of the final product when melted together.

Thus, a wide variety of packaging material may be used, with materials permitting ready removal from the adhesive being preferred.

To enhance the ability to remove the adhesive from the packaging material, the packaging material may be provided with a release material. Examples of applications in which the packaging material is removed prior to post-polymerization processing include moisture-curable sealant compositions. These adhesive compositions would preferably be prepared in the form of a sealed pouch which is stripped to permit application of the sealant composition. Other examples include optically clear adhesives.

Pressure Sensitive Adhesive Articles

In a preferred embodiment, the adhesive is a pressure sensitive adhesive at 25° C. In another preferred embodiment, a hot melt coated mixture of the adhesive and the packaging material is a pressure sensitive adhesive at 25° C. and has a storage modulus when measured in torsional shear at 25° C. and at 1 radian/second of between about $10^4$ and about $10^7$ dynes/cm$^2$. The (co)polymerized adhesives of the invention preferably have a storage modulus (G') when measured in torsional shear at 25° C. and at 1 second (or frequency of 1 radian/second) between about $10^4$ and $10^8$ dynes/cm$^2$ and more preferably between about $10^4$ and $10^7$ dynes/cm$^2$.

The (co)polymerized adhesives may be used to make a coatable thermoplastic or thermosettable hot melt adhesive by introducing the adhesive and its packaging material into a vessel in which the adhesive and its packaging material are melted. This hot melt adhesive may be used to form a pressure sensitive adhesive sheet by coating the melted adhesive and its packaging material onto a sheet material or another suitable substrate. The sheet material is preferably selected from a tape backing or a release liner.

In certain exemplary embodiments, the pressure sensitive adhesive is applied to a major surface of a substrate as at least one layer of the pressure sensitive adhesive on the major surface of the substrate. Preferably, the pressure sensitive adhesive layer has a thickness of at least 5 micrometers, 10 μm, 25 μm, 50 μm, 100 μm, 200 μm, 300 μm, 400 μm, 500 μm, 750 μm, or even 1 mm; and no more than 5 mm, 2 mm, 1 mm, 750 μm, 500 μm, 400 μm, 300 μm, 250 μm, or even 100 μm.

Preferably, the polymerized adhesives are hot melt coated onto a major surface of the substrate by putting the packaged adhesive in a hot melt coater at a temperature sufficient to melt the packaged adhesive and with sufficient mixing to form a coatable mixture, which is coated onto a substrate. This step can be done conveniently in a heated extruder, bulk tank melter, melt-on-demand equipment, or a hand-held hot melt adhesive gun. If a crosslinking agent or photoinitiator is added, the coated adhesive can then be exposed to sufficient UV radiation or ionizing radiation during subsequent coating or processing to effect the crosslinking Crosslinking is preferably initiated after coating.

The steps may be done in-line, i.e., the pre-adhesive composition may be surrounded by the packaging material, polymerized, hot melt coated to form a tape, and optionally crosslinked, or the steps may be performed individually at separate times and sites. For example, the packaged pre-adhesive composition may be polymerized at one time and extruded and crosslinked at another time.

In one exemplary embodiment, a tape is formed in which the substrate is a tape backing. Typical tape backings include cellulosic materials such as paper, crepe paper, and cloth (including both woven and non-woven cloths); films such as biaxially oriented polyester, polyvinyl chloride, polyurethane, biaxially and monoaxially oriented polypropylene, nylon; foam materials such as polyethylene foams and acrylic foams; and metal foils such as aluminum foil. The backings are usually treated on the back side with a release coating such as silicone, and may be treated prior to hot melt coating to enhance the adhesion of the adhesive to the backing Treatments useful for enhancing the adhesion of the adhesive to the backing include chemical priming and corona treatment.

In another exemplary embodiment, a transfer tape is formed wherein the substrate is a release liner. The release liner can be coated on one or both sides with a release coating, and the transfer tape is removed from the substrate when used by the end user.

In yet another embodiment, the substrate is the surface of a part to be bonded to another part with the hot melt adhesive. In another embodiment of the invention, the adhesive or a tape made out of the adhesive is used to damp vibrations or as a sealant. Additionally, the adhesive can be coated on one or both sides of a backing to form a double-coated tape.

In the practice of one embodiment of the disclosure, two lengths of thermoplastic film are heat sealed together across the bottom and on each of the lateral edges on a liquid form-fill-seal machine to form an open ended pouch. The reaction mixture is pumped through a hose to fill the pouch, and the pouch is then heat sealed across the top to completely surround the adhesive composition.

Preferably, the form-fill-seal machine is equipped with an impulse sealer to form the top and bottom seal across the pouches. Such a sealer has one or two sets of jaws that clamp the pouch shut before sealing. A sealing wire is then heated to effect the seal, and the seal is cooled before the jaws are released. The sealing temperature is generally above the softening point and below the melting point of the film used to form the pouch.

During the sealing process, it is desirable to get most of the air out of the pouch before sealing. A small amount of air is tolerable so long as the amount of oxygen is not sufficient to substantially interfere with the polymerization process. For ease of handling, it is desirable to seal the pouches as soon as they are filled with the composition, although immediate sealing is not necessary in all cases. In some cases the reaction mixture can alter the packaging material, and it is desirable to cross-seal the pouches within about one minute of filling, more preferably within 30 seconds, and most preferably within 15 seconds.

If the reaction mixture decreases the strength of the packaging material, it is preferable to polymerize the composition as soon as possible after the reaction mixture is surrounded by the packaging material. For the combination of (meth)acrylate monomers with ethylene acrylic acid, ethylene vinyl acetate, or ionomer films, it is preferable to polymerize the composition within about 24 hours of sealing the pouches.

Alternatively, a single length of film can be folded lengthwise and sealed on one edge, filled with the reaction mixture, and sealed. In another embodiment, a single length of film can be pulled through a forming collar, sealed to form a tube, filled with the composition, and sealed. Another embodiment can be carried out on commercial liquid form-fill-seal machines. A source of such machines is the Packaging Machinery Division of Eagle Corp. It is contemplated that the seals can be effected in any of a number of different configurations to form multiple pouches across and down the lengths of film.

For example, in addition to the seals on the lateral edges, a seal can also be formed down the center of the lengths of film so that a cross seal will form two filled pouches. The pouches can either be left attached to each other by the cross-seals and/or vertical seals, or they can be cut into individual pouches or strands of pouches. The pouches may each contain the same or different compositions.

The reaction mixture can then be polymerized to form an adhesive composition within the polymeric pouch by any of the aforementioned methods. The adhesive composition within the polymeric pouch may be used to damp vibrations. Alternatively, the adhesive composition itself may be used to damp vibrations.

In another embodiment of the disclosure, a reaction mixture is coated onto a carrier web, covered with a sheet material, and polymerized with transmissive energy, wherein the carrier web, the sheet material, or both, are hot melt coatable with the adhesive. If both the carrier web and the sheet material are hot melt coatable, the resulting composite can be fed directly into a hot melt coater, or cut into smaller strips or pieces and fed to the hot melt coater. If only one of the carrier web or the sheet material is hot melt-coatable with the adhesive, the non-coatable entity is removed before the adhesive is hot melt coated. To facilitate handling after the non-coatable entity is removed, the polymerized adhesive can be folded over onto itself so that the coatable entity substantially surrounds the major surfaces of the coated adhesive. The adhesive web can then be fed into a hot melt coater, or it can be cut to smaller strips or pieces before hot melt coating.

If either the carrier web or the sheet material are not coatable with the adhesive (e.g., as in the case of Type II compositions, described below), it should be treated, if necessary, so that the adhesive can be removed easily from it. Such treatments include silicone release coatings, polyfluoropolyether coatings, and polyfluoroethylene coatings such as Teflon™.

The carrier web should provide sufficient strength to support the coated reaction mixture during polymerization, or it can be supported by a platen during polymerization. The carrier web can be an endless conveyor belt, or it can be a flexible material which can be wound into a roll with the adhesive; the carrier web is itself a sheet material. Endless conveyor belts can be made from silicone elastomers; polymeric films such as those made from polyfluoroethylene, polyester, nylon, polycarbonate, and the like; metals such as stainless steel; rubber; glass fibers; and the like. Useful flexible materials include paper and polymeric films such as those made from polyester, nylon, polycarbonates, polyolefins, ethylene acrylic acid, ethylene vinyl acetate, ionomers, and the like. Coatable flexible materials include polyolefins such as polypropylene, polyethylene, and polybutadiene; ethylene acrylic acid; ethylene vinyl acetate; and ionomers.

Likewise, the sheet material can be made from the aforementioned flexible materials as well as non-flexible plates made of glass, polymers, or metals, which may optionally be coated with a release material. If the reaction mixture is to be subsequently photo-polymerized, the carrier web, the sheet material, or both should be sufficiently transparent to actinic radiation to effect such photopolymerization.

Preferably, the packaging material does not substantially adversely affect the adhesive properties of a hot melt coated mixture of the packaging material and an adhesive produced from polymerization of the reaction mixture, and a hot melt coated mixture of the adhesive and the packaging material preferably has a storage modulus when measured in torsional shear at 25° C. and at 1 radian/second of between about $10^4$ and about $10^8$ dynes/cm$^2$.

Exemplary embodiments of the present disclosure may take on various modifications and alterations without departing from the spirit and scope of the present disclosure. Accordingly, it is to be understood that the embodiments of the present disclosure are not to be limited to the following described exemplary embodiments, but is to be controlled by the limitations set forth in the claims and any equivalents thereof. On the contrary, it is to be clearly understood that resort may be had to various other embodiments, modifications, and equivalents thereof which, after reading the description herein, may suggest themselves to those skilled in the art without departing from the spirit of the present disclosure and/or the scope of the appended claims.

EXAMPLES

These examples are merely for illustrative purposes and are not meant to be limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Materials

Table 1 presents a listing of the materials used in the Examples. All parts, percentages, ratios, and the like in the examples are by weight, unless noted otherwise. Solvents and other reagents used may be obtained from Sigma-Aldrich Chemical Company (Milwaukee, Wis.) unless otherwise noted.

TABLE 1

| Material | Chemical Composition | Source |
|---|---|---|
| AA | Acrylic Acid | Sigma-Aldrich Chemical, Milwaukee, WI |
| MA | Methyl acrylate | Sigma-Aldrich Chemical, Milwaukee, WI |
| IOA | Isooctyl acrylate | 3M Company, St. Paul, MN |
| 2-EHA | 2-ethyl hexyl acrylate | Sigma-Aldrich Chemical, Milwaukee, WI |
| 2-OA | 2-octyl acrylate | 3M Company, St. Paul, MN |
| FOA | Fusel oil acrylate | 3M Company, St. Paul, MN |
| MA | Methyl acrylate | Sigma-Aldrich Chemical, Milwaukee, WI |
| MAA | Methacrylic acid | Sigma-Aldrich Chemical, Milwaukee, WI |
| MMA | Methyl methacrylate | Alfa Aesar, Ward Hill, MA |
| ABP | 4-acryloxy benzophenone | Prepared according to U.S. Pat. No. 4,737,559 |
| IOTG | Isooctylthioglycoate | TCI America, Portland, OR |
| IPA | 2-propanol | VWR International, Radnor, PA |
| | 1-dodecanethiol | Alfa Aesar, Ward Hill, MA |

Test Methods

The test methods used in the Examples are described further below.

Monomer Residuals

Monomer residuals were measured using an NIR procedure. The IR signature (wavelength and response factor) of each monomer was calibrated to absolute content, which enables quantitative measurement of residuals (in wt. %).

Gel Content

Gel content was determined by immersing the samples, enclosed in wire mesh cages, in ethyl acetate for 24 hours to extract any soluble (co)polymer chains. The percent gel reported is the portion of the total mass remaining after attempted dissolution.

Glass Transition Temperature ($T_g$)

Differential scanning calorimetry to determine $T_g$ was done by testing 10 milligram samples in a TA Instruments Q200, scanning from room temperature to 150° C. at 10° C./min.

Experimental Apparatus

The experimental apparatus used to irradiate the reaction mixtures in the currently described Examples was a Nordion JS-10000 Hanging Tote Irradiator manufactured by Nordion Corp. (Ottawa, Ontario, Canada).

The irradiation with gamma rays as a source of ionizing radiation was accomplished using a source strength of 1.5 to 3 MCi from a source consisting of a series of hollow stainless steel tubes containing Co-60 ($^{60}$Co). Generally, mid-way through the dose exposure of multiple samples, the samples were retrieved from the irradiation chamber, and the relative position reversed to provide a more uniform exposure. The samples were conveyed into the irradiation chamber and exposed to gamma rays for periods of time necessary to achieve the desired dose.

Sample Preparation and Dose

Samples were generated by exposure of the monomer mixtures to gamma radiation. The dose (energy/mass) delivered to each sample was measured with B3 DoseStix radiochromic thin film dosimeters which were evaluated shortly after irradiation. The total absorbed doses ranged from 5 to 20 kGy, and dose rates were about 0.0005 to 0.005 kGy/sec.

Samples were prepared by metering the monomer mixture into typically 20-30 g containers, with care taken to ensure the container contained as little air as possible. The samples were placed in a room-temperature water bath during irradiation.

Example 1

2-EHA/AA/IOTG

A monomer mixture of 96.5 wt % 2-EHA, 3.38 wt % AA, and 0.12 wt % IOTG was prepared. Twenty-five grams of the monomer mixture was metered into an empty film container and heat-sealed, taking care to eliminate as much headspace as possible. The container was placed in a room temperature water bath and exposed to gamma radiation to a dose of 4.4 kGy. The resulting sample had monomer residuals of 0.43 wt % and a gel content of <1 wt %.

Example 2

2-EHA/AA/IOTG

A monomer mixture of 96.5 wt % 2-EHA, 3.38 wt % AA, and 0.12 wt % IOTG was prepared. Twenty-five grams of the monomer mixture was metered into an empty film container and heat-sealed, taking care to eliminate as much headspace as possible. The container was placed in a room temperature water bath and exposed to gamma radiation to a dose of 9.4 kGy. The resulting sample had monomer residuals of 0.04 wt % and a gel content of <1 wt %.

Example 3

2-EHA/AA/IOTG

A monomer mixture of 96.5 wt % 2-EHA, 3.38 wt % AA, and 0.12 wt % IOTG was prepared. Twenty-five grams of the monomer mixture was metered into an empty film container and heat-sealed, taking care to eliminate as much headspace as possible. The container was placed in a room temperature water bath and exposed to gamma radiation to a dose of 19.7 kGy. The resulting sample had monomer residuals of 0.04 wt % and a gel content of 20 wt %.

Example 4

2-EHA/AA/IOTG

A monomer mixture of 96.5 wt % 2-EHA, 3.38 wt % AA, and 0.12 wt % IOTG was prepared. Twenty-five grams of the monomer mixture was metered into an empty film container and heat-sealed, taking care to eliminate as much headspace as possible. The container was placed in a room temperature water bath and exposed to gamma radiation to a dose of 37.1 kGy. The resulting sample had monomer residuals of 0.05 wt % and a gel content of 56 wt %.

Example 5

2-EHA/AA/IOTG

A monomer mixture of 96.5 wt % 2-EHA, 3.46 wt % AA, and 0.04 wt % IOTG was prepared. Twenty-five grams of the monomer mixture was metered into an empty film container and heat-sealed, taking care to eliminate as much headspace as possible. The container was placed in a room temperature water bath and exposed to gamma radiation to a dose of 6.3 kGy. The resulting sample had monomer residuals of 0.16 wt % and a gel content of 3 wt %.

Example 6

2-EHA/AA/IOTG

A monomer mixture of 96.5 wt % 2-EHA, 3.3 wt % AA, and 0.20 wt % IOTG was prepared. Twenty-five grams of the monomer mixture was metered into an empty film container and heat-sealed, taking care to eliminate as much headspace as possible. The container was placed in a room temperature water bath and exposed to gamma radiation to a dose of 4.4 kGy. The resulting sample had monomer residuals of 0.48 wt % and a gel content of 4 wt %.

Example 7

2-EHA/AA/1-dodecanethiol

A monomer mixture of 96.5 wt % 2-EHA, 3.42 wt % AA, and 0.08 wt % 1-dodecanethiol was prepared. Twenty-five grams of the monomer mixture was metered into an empty film container and heat-sealed, taking care to eliminate as much headspace as possible. The container was placed in a room temperature water bath and exposed to gamma radiation to a dose of 6.5 kGy. The resulting sample had monomer residuals of 0.26 wt % and a gel content of 9 wt %.

Example 8

2-EHA/AA/IPA

A monomer mixture of 91.7 wt % 2-EHA, 3.3 wt % AA, and 5 wt % IPA was prepared. Twenty-five grams of the monomer mixture was metered into an empty film container and heat-sealed, taking care to eliminate as much headspace as possible. The container was placed in a room temperature water bath and exposed to gamma radiation to a dose of 6.5 kGy. The resulting sample had monomer residuals of 0.93 wt % and a gel content of 9 wt %.

Example 9

2-EHA/AA/IOTG

A monomer mixture of 90 wt % 2-EHA, 9.94 wt % AA, and 0.06 wt % IOTG was prepared. Twenty-five grams of the monomer mixture was metered into an empty film container and heat-sealed, taking care to eliminate as much headspace as possible. The container was placed in a room temperature water bath and exposed to gamma radiation to a dose of 6.0 kGy. The resulting sample had monomer residuals of 0.04 wt % and was melt-pressable.

Example 10

IOA/AA/IOTG

A monomer mixture of 96.5 wt % IOA, 3.38 wt % AA, and 0.12 wt % IOTG was prepared. Twenty-five grams of the monomer mixture was metered into an empty film container and heat-sealed, taking care to eliminate as much headspace as possible. The container was placed in a room temperature water bath and exposed to gamma radiation to a dose of 24.2 kGy. The resulting sample had monomer residuals of 0.21 wt % and a gel content of 2 wt %.

Example 11

2OA/AA/IOTG

A monomer mixture of 94 wt % 2OA, 5.96 wt % AA, and 0.04 wt % IOTG was prepared. Twenty-five grams of the monomer mixture was metered into an empty film container and heat-sealed, taking care to eliminate as much headspace as possible. The container was placed in a room temperature water bath and exposed to gamma radiation to a dose of 6.5 kGy. The resulting sample had monomer residuals of 0.97 wt % and was melt-pressable.

Example 12

FOA/IOTG

A monomer mixture of 99.96 wt % FOA and 0.04 wt % IOTG was prepared. Twenty-five grams of the monomer mixture was metered into an empty film container and heat-sealed, taking care to eliminate as much headspace as possible. The container was placed in a room temperature water bath and exposed to gamma radiation to a dose of 6.3 kGy. The resulting sample had monomer residuals of 3.46 wt % and was melt-pressable.

Example 13

2-EHA/AA/IOTG/ABP

A monomer mixture of 95.19 wt % 2-EHA, 4.25 wt % AA, 0.06 wt % IOTG, and 0.5 wt % ABP was prepared. Twenty-five grams of the monomer mixture was metered into an empty film container and heat-sealed, taking care to eliminate as much headspace as possible. The container was placed in a room temperature water bath and exposed to gamma radiation to a dose of 6.7 kGy. The resulting sample had monomer residuals of 0.17 wt %. The sample was melt-mixed with 33 wt % Foral 3085 and coated to a thickness of 18 grains per 4"×6". The sample was tested for gel content before and after exposure to 200 mJ UVB. Gel content was 1 wt % before UV exposure and 59 wt % after exposure.

Example 14

MA/MMA/MAA/IOA/IOTG

A monomer mixture of 45 wt % MA, 45 wt % MMA, 4.92 wt % MAA, 5 wt % IOA, and 0.08 wt % IOTG was prepared. Twenty-five grams of the monomer mixture was metered into an empty film container and heat-sealed, taking care to eliminate as much headspace as possible. The container was placed in a room temperature water bath and exposed to gamma radiation to a dose of 20.6 kGy. The resulting sample had monomer residuals of 0.04 wt % by GC. The glass transition temperature of the sample was measured by DSC to be 97.7° C.

Table 2 presents a summary of the formulations and properties of the samples obtained in the Examples.

TABLE 2

| Example | (Co)polymer Designation | Composition (wt %) | Dose (kGy) | Residual Monomer Level (wt %) | Gel Content (wt %) |
|---|---|---|---|---|---|
| 1 | 2-EHA/AA/IOTG | 96.5/3.38/0.12 | 4.4 | 0.43 | <1 |
| 2 | 2-EHA/AA/IOTG | 96.5/3.38/0.12 | 9.4 | 0.04 | <1 |
| 3 | 2-EHA/AA/IOTG | 96.5/3.38/0.12 | 19.7 | 0.04 | 20 |
| 4 | 2-EHA/AA/IOTG | 96.5/3.38/0.12 | 37.1 | 0.05 | 56 |
| 5 | 2-EHA/AA/IOTG | 96.5/3.46/0.04 | 6.3 | 0.16 | 3 |
| 6 | 2-EHA/AA/IOTG | 96.5/3.3/0.20 | 4.4 | 0.48 | 4 |
| 7 | 2-EHA/AA/1-dodecanethiol | 96.5/3.42/0.08 | 6.5 | 0.26 | 9 |
| 8 | 2-EHA/AA/IPA | 91.7/3.3/5 | 6.5 | 0.93 | 9 |
| 9 | 2-EHA/AA/IOTG | 90/9.94/0.06 | 6.0 | 0.04 | — |
| 10 | IOA/AA/IOTG | 96.5/3.38/0.12 | 24.2 | 0.21 | 2 |
| 11 | 2OA/AA/IOTG | 94/5.96/0.04 | 6.5 | 0.97 | — |
| 12 | FOA/IOTG | 99.96/0.04 | 6.3 | 3.46 | — |
| 13 | 2-EHA/AA/IOTG/ABP | 95.19/4.25/0.06/0.5 | 6.7 | 0.17 | 1 |
| 14 | MA/MMA/MAA/IOA/IOTG | 45/45/4.92/5/0.08 | 20.6 | 0.04* | — |

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. The particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. Furthermore, all publications, published patent applications and issued patents referenced herein are incorporated by reference in their entirety to the same extent as if each individual publication or patent was specifically and individually indicated to be incorporated by reference. Various exemplary embodiments have been described. These and other embodiments are within the scope of the following claims.

The invention claimed is:

1. A method of forming an adhesive composition comprising the steps of:
   (a) combining:
      (i) a non-deaerated mixture comprising at least one free radically (co)polymerizable ethylenically-unsaturated material, wherein the mixture is non-heterogeneous; and
      (ii) a sealable packaging, wherein the packaging contains the non-deaerated mixture;
   (b) sealing the non-deaerated mixture in the packaging to form a sealed packaging;
   (c) exposing the non-deaerated mixture in the sealed packaging to a source of ionizing radiation for a time sufficient to initiate (co)polymerization of at least a portion of the at least one free radically (co)polymerizable ethylenically-unsaturated material to form an adhesive composition in the sealed packaging, wherein the source of ionizing radiation is selected from a gamma ray source, an x-ray source, an electron beam source having an emission energy of greater than 300 keV, and combinations thereof, additionally wherein the polymerization takes place essentially non-adiabatically, further wherein at least a portion of the packaging is meltable and mixable with the adhesive composition so as to provide a coatable adhesive composition when the sealed packaging containing the adhesive composition is heated to a temperature sufficient to melt at least a portion of the packaging.

2. The method of claim 1, wherein the adhesive composition is a pressure sensitive adhesive composition, optionally wherein the pressure sensitive adhesive composition is a hot melt pressure sensitive adhesive composition.

3. The method of claim 1, further comprising removing the packaging from the adhesive composition and heating the adhesive composition to a temperature above a glass transition temperature of the adhesive composition.

4. The method of claim 1, wherein the mixture is substantially free of thermally-induced or UV-induced free radical (co)polymerization initiators.

5. The method of claim 1, wherein the mixture is blanketed with an inert gas to reduce oxygen levels in a vapor space of the packaging before the completion of step (b).

6. The method of claim 1, wherein the mixture further comprises a chain transfer agent, optionally wherein the chain transfer agent is selected from the group consisting of carbon tetrabromide, hexanebromoethane, bromotrichloromethane, ethanethiol, isooctylthioglycoate, 2-mercaptoethanol, 3-mercapto-1,2-propanediol, 2-butyl mercaptan, n-octyl mercaptan, t-dodecylmercaptan, 2-ethylhexyl mercaptopropionate, 2 mercaptoimidazole, 2-mercaptoethyl ether, cumene, ethyl acetate, ethanol, 2-propanol, and combinations thereof.

7. The method of claim 1, wherein the mixture is exposed to ionizing radiation for a time sufficient to receive a dose of ionizing radiation up to 100 kiloGray.

8. The method of claim 1, wherein the mixture further comprises a photoinitiator, optionally wherein the photoinitiator is selected from the group consisting of acetophenones, substituted alpha-ketols, benzoin ethers, substituted benzoin ethers, aromatic sulfonyl chlorides, 2,4,6-trimethylbenzoyl-diphenyl-phosphineoxide, 2-hydroxy-2-methyl-1-phenyl-propan-1-one, 1-hydroxy-cyclohexyl-phenyl-ketone, 2,2-dimethoxy-1,2-diphenylethan-1-one, bis(2,4,6-trimethylbenzoyl)-phenylphosphineoxide], benzene, (1-methylethenyl)-, homopolymer, Ar-(2-hydroxy-2-methyl-1-oxopropyl), and combinations thereof.

9. The method of claim 1, wherein the free radically (co)polymerizable ethylenically-unsaturated material is comprised of vinyl-functional monomers, vinyl-functional oligomers, vinyl-functional macromers, or a combination thereof.

10. The method of claim 1, wherein the free radically (co)polymerizable ethylenically-unsaturated monomers are comprised of difficult to (co)polymerize monomers selected from N-vinyl pyrrolidone, N,N-dimethyl acrylamide, (meth)acrylic acid, acrylamide, N-octyl acrylamide, styrene, vinyl acetate, and combinations thereof.

11. The method of claim 1, wherein the mixture further comprises a non-reactive diluent selected from the group consisting of plasticizers, tackifiers, particulate fillers, nonvolatile organic solvents, and combinations thereof.

12. The method of claim 11, wherein the non-reactive diluent is selected from a plasticizer, optionally wherein the plasticizer is selected from the group consisting of dioctyl phthalate, phosphate esters, and alkyl or aryl functionalized polyalkylene oxides.

13. The method of claim 12, wherein the non-reactive diluent is selected from a tackifier, optionally wherein the tackifier is selected from the group consisting of esters of hydrogenated rosins and synthetic hydrocarbon resins.

14. The method of claim 11, wherein the non-reactive diluent is selected from a particulate filler, optionally wherein the particulate filler is selected from the group consisting of surface treated particulates, electrically conductive particulates, metal oxide particulates, and combinations thereof.

15. The method of claim 11, wherein the non-reactive diluent is added at a level of about 1% to about 25% by weight, based upon the total weight of the mixture.

16. The method according to claim 1, wherein the sealed packaging is formed by disposing the mixture between a pair of sheets, wherein the pair of sheets are sealed to contain the mixture, further wherein at least one of the sheets is meltable and mixable with the adhesive when the sealed packaging containing the adhesive composition is heated to a temperature sufficient to melt the at least one sheet.

17. An adhesive prepared according to claim 1, wherein the pressure-sensitive adhesive exhibits a FOG value, determined according to VDA-278, of no more than 1,000 µg/g, and optionally a VOC value, determined according to VDA-278, of no more than 2,000 µg/g.

18. The adhesive of claim 17, wherein the adhesive composition exhibits an optical activity substantially identical to an optical activity of the mixture.

19. An adhesive article incorporating the adhesive of claim 17, wherein the adhesive article comprises at least one layer of the adhesive composition on a major surface of a substrate, optionally wherein the at least one layer has a thickness of at least 1 mm.

* * * * *

UNITED STATES PATENT AND TRADEMARK OFFICE
CERTIFICATE OF CORRECTION

| | | |
|---|---|---|
| PATENT NO. | : 9,580,631 B2 | Page 1 of 2 |
| APPLICATION NO. | : 14/648003 | |
| DATED | : February 28, 2017 | |
| INVENTOR(S) | : Daniel O'Neal | |

It is certified that error appears in the above-identified patent and that said Letters Patent is hereby corrected as shown below:

On the Title Page

Column 1
Title, Item (54), Delete "PACKAGE," and insert -- PACKAGED --, therefor.

In the Specification

Column 3
Lines 32-33, Delete "isooctylthioglycoate," and insert -- isooctylthioglycolate, --, therefor.
Line 53, Delete "phenylphosphineoxide]," and insert -- phenylphosphineoxide, --, therefor.

Column 8
Line 17 (approx.), After "homogeneous"" insert -- . --.

Column 14
Line 38, Delete "isooctylthioglycoate," and insert -- isooctylthioglycolate, --, therefor.

Column 16
Line 18, Delete "DAROCURE" and insert -- DAROCUR --, therefor.
Line 20, Delete "DAROCURE" and insert -- DAROCUR --, therefor.

Column 19
Line 49, Delete "ethylenically unsaturated" and insert -- ethylenically-unsaturated --, therefor.

Column 25
Lines 59-61, Delete "Thus, a wide variety of packaging material may be used, with materials permitting ready removal from the adhesive being preferred." and insert the same on Column 25, Line 58 (approx.) as a continuation of the same paragraph.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,580,631 B2

Column 26
Line 45, After "crosslinking" insert -- . --.
Line 65, After "backing" insert -- . --.

Column 29 (Table 1)
Line 16, Delete "4-acryloxy benzophenone" and insert -- 4-acryloxybenzophenone --, therefor.
Line 18 (approx.), Delete "Isooctylthioglycoate" and insert -- Isooctylthioglycolate --, therefor.

Column 33
Line 1, Delete "Foral," and insert -- FORAL™ --, therefor.

In the Claims

Column 35
Line 5 (approx.), In Claim 6, delete "isooctylthioglycoate," and insert -- isooctylthioglycolate, --, therefor.
Line 8 (approx.), In Claim 6, delete "2 mercaptoimidazole," and insert -- 2-mercaptoimidazole, --, therefor.
Line 22, In Claim 8, delete "phenylphosphineoxide]," and insert -- phenylphosphineoxide, --, therefor.